US012649455B2

(12) United States Patent
Aquila et al.

(10) Patent No.: US 12,649,455 B2
(45) Date of Patent: Jun. 9, 2026

(54) MULTIFUEL ADAPTABLE SERIES HYBRID VEHICLE

(71) Applicant: Canoo Technologies Inc., Torrance, CA (US)

(72) Inventors: Anthony Aquila, Justin, TX (US); Nitinkumar Patel, Torrance, CA (US)

(73) Assignee: WHS ENERGY SOLUTIONS, LLC, Argyle, TX (US)

( * ) Notice: Subject to any disclaimer, the term of this patent is extended or adjusted under 35 U.S.C. 154(b) by 81 days.

(21) Appl. No.: 18/612,845

(22) Filed: Mar. 21, 2024

(65) Prior Publication Data

US 2025/0296547 A1 Sep. 25, 2025

(51) Int. Cl.
    *B60W 20/13* (2016.01)

(52) U.S. Cl.
    CPC ....... *B60W 20/13* (2016.01); *B60W 2510/244* (2013.01)

(58) Field of Classification Search
    CPC ........................ B60W 20/13; B60W 2510/244
    See application file for complete search history.

(56) References Cited

U.S. PATENT DOCUMENTS

2023/0219554 A1* 7/2023 Powell ........... B60W 30/18054
                                                          701/22

* cited by examiner

Primary Examiner — Wade Miles
Assistant Examiner — Zachary Joseph Wallace
(74) Attorney, Agent, or Firm — ALLEN, DYER, DOPPELT, + GILCHRIST, P.A. Attorneys at Law

(57) ABSTRACT

A system and method for managing a series hybrid powertrain in an electric vehicle platform includes a battery, at least one traction electric motor, an internal combustion engine/motor generator combination and a vehicle supervisory controller. The battery is configured to supply power to the electric motor, and the electric motor is configured to drive the wheels of the electric vehicle. The internal combustion engine/motor generator is configured to generate electricity to recharge the battery pack and optionally provide additional power to the electric motor when necessary. The vehicle supervisory controller is configured to manage the operation of the series hybrid powertrain. The controller is programmed with a set of algorithms that determine the optimal use of the battery, electric motor, and internal combustion engine/motor generator based on various factors, including but not limited to the current state of the battery pack charge, driving conditions, and electric motor power requirements.

20 Claims, 26 Drawing Sheets

MULTIFUEL ADAPTABLE SERIES HYBRID VEHICLE

TECHNICAL FIELD

This application is related to the subject matter of U.S. Non-Provisional patent application Ser. No. 17/691,036 filed Mar. 9, 2022 and entitled "Multi-Platform Reconfigurable Electric Vehicle," and to the subject matter of U.S. Non-Provisional patent application Ser. No. 18/478,254 filed Sep. 29, 2023 and entitled "Auxiliary Power Unit (APU) for Electric Vehicles (EVs)," both assigned to the assignee of the present application. The content of the above identified patent documents is incorporated herein by reference.

TECHNICAL FIELD

This disclosure relates generally to hybrid vehicles. More specifically, this disclosure relates to a system and method for managing a series hybrid powertrain in an electric vehicle.

BACKGROUND

Electric vehicles (EVs) utilize batteries that typically consist of several smaller cells arranged together. Advanced energy storage system technologies have enabled greater range in EVs, but lack of sufficient charging system infrastructure remains the number one challenge for further attraction towards EVs. This issue becomes extremely critical in military applications, where there is no access to the charging system infrastructure in the combat field and recharging the combat EVs becomes a major challenge.

Current EVs are equipped with an on-board charger (OBC) module that is meant to provide charging power to the EVs when utilizing a Level-1 (L1) or Level-2 (L2) charging system to recharge the vehicle's propulsion battery pack. In most cases, the OBC is bidirectional, meaning that the OBC can both charge the vehicle using L1/L2 charging and provide power outlet (e.g., 110 volts (V)/240V) capability on board. However, the two functions of charging and providing power output capability cannot be satisfied at the same time. In other words, while the vehicle is being charged, there is no access to power via the power outlets such that external 110V/240V tools cannot be powered by the vehicle power system while vehicle is being charged. This causes inconvenience for consumer applications, and will be more critical for military applications.

Hybrid vehicles include an internal combustion engine (ICE) as well as an electric traction motor, to augment the range of the vehicle between charges. Various configurations of the electric and ICE subsystems have been proposed or implemented for or within hybrid vehicles.

SUMMARY

The present disclosure provides a system and method for managing a series hybrid powertrain in a vehicle platform. The system includes a battery, at least one traction electric motor, an internal combustion engine/motor generator combination and a vehicle supervisory controller. The battery is configured to supply power to the electric motor, and the electric motor is configured to drive the wheels of the vehicle. The internal combustion engine/motor generator is configured to generate electricity to recharge the battery pack and optionally provide additional power to the electric motor when necessary.

The system further includes a vehicle supervisory controller that is configured to manage the operation of the series hybrid powertrain. The controller is programmed with a set of algorithms that determine the optimal use of the battery, electric motor, and internal combustion engine/motor generator based on a variety of factors, including but not limited to, the current state of charge of the battery pack, the driving conditions, and the power requirements of the electric motor.

The system may also include a user interface that allows the driver to monitor and control the operation of the series hybrid powertrain. The user interface displays information about the current state of the battery, the power output of the electric motor, and the operation of the internal combustion engine/motor generator. The user interface may also allow the driver to adjust the settings of the series hybrid powertrain to optimize performance and efficiency.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts:

FIG. 6 illustrates an alternative design for a powertrain system in accordance with the present disclosure;

FIGS.

DETAILED DESCRIPTION

FIGS. 1 through 13, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Figure 1:
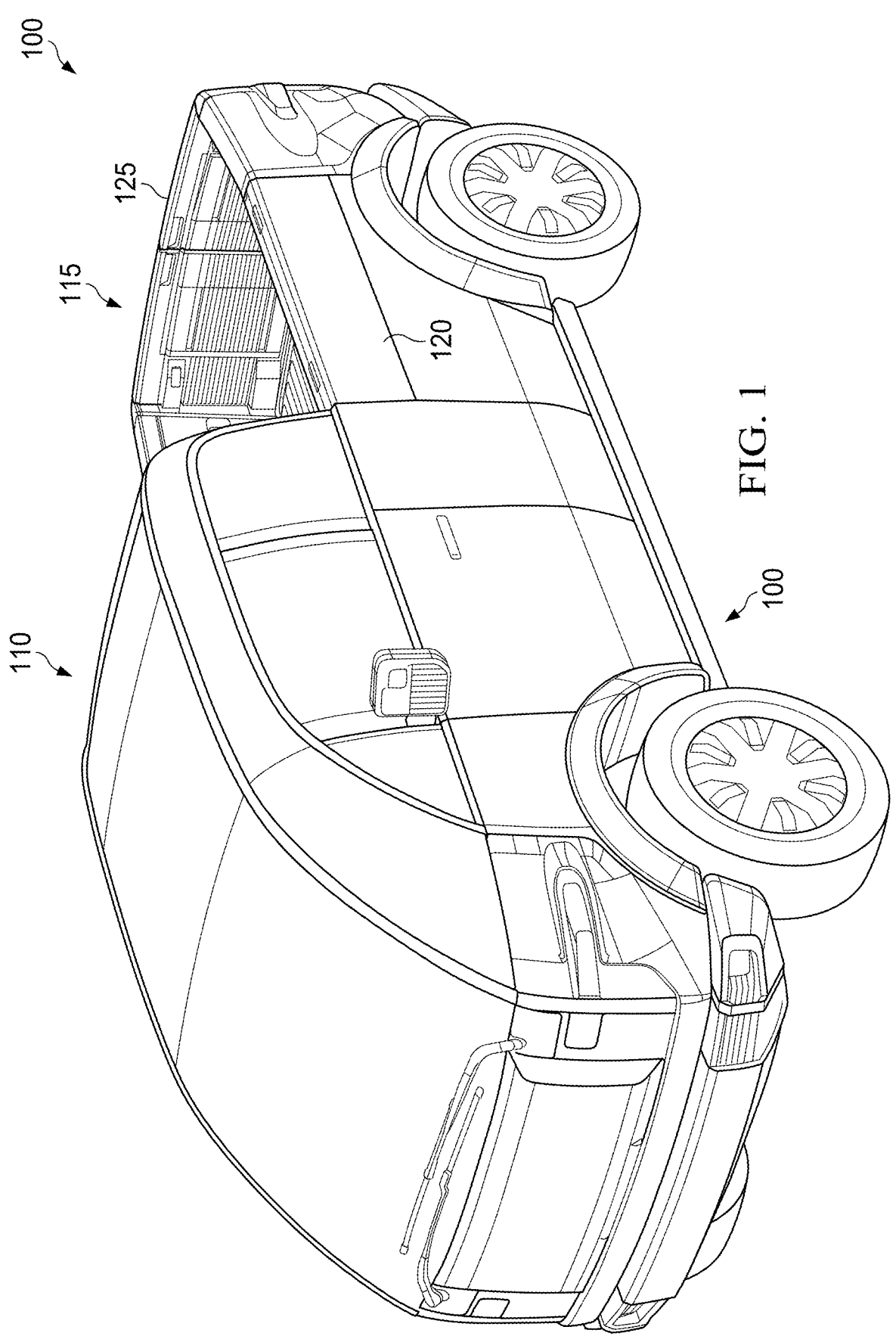
FIG. 1 illustrates an example multi-platform, reconfigurable, multifuel adaptable series hybrid electric pick-up truck according to embodiments of the present disclosure.

FIG. 1 illustrates an example multi-platform, reconfigurable, multifuel adaptable series hybrid electric pick-up truck according to embodiments of the present disclosure. The embodiment of the vehicle 100 illustrated in FIG. 1 is for illustration and explanation only. FIG. 1 does not limit the scope of this disclosure to any particular implementation of a vehicle.

In the example illustrated in FIG. 1, the vehicle 100 includes a top hat structure coupled to an electric vehicle platform. The platform of vehicle 100 of FIG. 1 includes a chassis (not visible in FIG. 1) supporting a cabin 110 for carrying passengers. In some embodiments, the chassis of the vehicle 100 is in the form of a "skateboard" vehicle platform supporting one or more energy storage elements (such as batteries) that provide input electrical power used by various components of the EV, such as one or more electric motors of the vehicle 100 and a control system of the vehicle 100 described in further detail below. The top hat structure is designed and dimensioned to have a crew cabin ("cab") 110 and a cargo bed 115. The cabin 110 is configured to provide a space for one or more persons to sit and either operate or ride in the vehicle. The cargo bed 115 comprises an open area enclosed by a rear surface of the crew cab 110, side panels 120, and a rear gate 125.

Passengers may enter and exit the cabin 110 through at least one door forming part of the cabin 110. A transparent windshield and other transparent panels mounted within and forming part of the cabin 110 allow at least one passenger (referred to as the "operator," even when the vehicle 100 is operating in an advanced driving or "AD" mode) to see outside the cabin 110. Rear-view mirrors mounted to sides of the cabin 110 enable the operator to see objects to the sides and rear of the cabin 110 and may include warning indicators (such as selectively illuminated warning lights) for features such as blind spot warning (indicating that another vehicle is in the operator's blind spot) and/or lane departure warning.

The cabin 110 is preferably dimensioned to accommodate a vehicle operator and at least one passenger. For example, the cabin 110 can be configured with a driver seat and passenger seat. The cabin 110 can include interior lighting and climate control systems, such as articulating, heated or cooled seats, and air vents coupled to an external source, a cabin heater, and an air condition unit. In certain embodiments, the cabin 110 includes a number of device holders, such as recesses to accommodate a beverage and recesses to accommodate one or more electronic devices. In certain embodiments, one or more of the surfaces or configured to attach various modular components. For example, one or more of the lateral surfaces may include a peg-board grid, webbing, picatinny rails, magnetic, electro-magnetic, hook and loop fasteners, and the like.

In certain embodiments one or more of the cabin 110 or cargo bed 115 includes one or more electrical outlets. The electrical outlets can be 110 volts or 220 volts. For example, a first electrical outlet can be 110 volts while a second electrical outlet is 220 volts. Conventional automobile features such as headlamps, taillights, turn signal indicators, windshield wipers, and bumpers are also depicted. The vehicle 100 may further include cargo storage within or connected to the cabin 110 and mounted on the chassis, and the cargo storage area(s) may optionally be partitioned by dividers from the passenger area(s) of the cabin 110.

The platform, which described in further detail below in connection with FIG. 2, includes a chassis for the top hat structure including the cabin 110 and cargo bed 115. Wheels mounted on axles that are supported by the chassis and driven by the motor(s) via drive gears (all not visible in FIG. 1) allow the vehicle 100 to move smoothly. The wheels are mounted on the axles in a manner permitting rotation relative to a longitudinal centerline of the vehicle 100 for steering and are also connected to steering controls (not visible).

Vehicle 100 may also include an ICE (not shown in FIG. 1) as a separate power source for the drivetrain unit(s) or as an electric generator to charge the energy storage elements. The ICE and interaction of the remainder of the vehicle 100 therewith are described in further detail below.

Although FIG. 1 illustrates one example of a vehicle 100, those skilled in the art will recognize that the full structure and operation of a suitable vehicle are not depicted in the drawings or described here. Instead, for simplicity and clarity, only the structures and operations necessary for an understanding the present disclosure are depicted and described. Various changes may be made to the example of FIG. 1, and the features described in this disclosure may be used with any other suitable vehicle.

Figure 2:
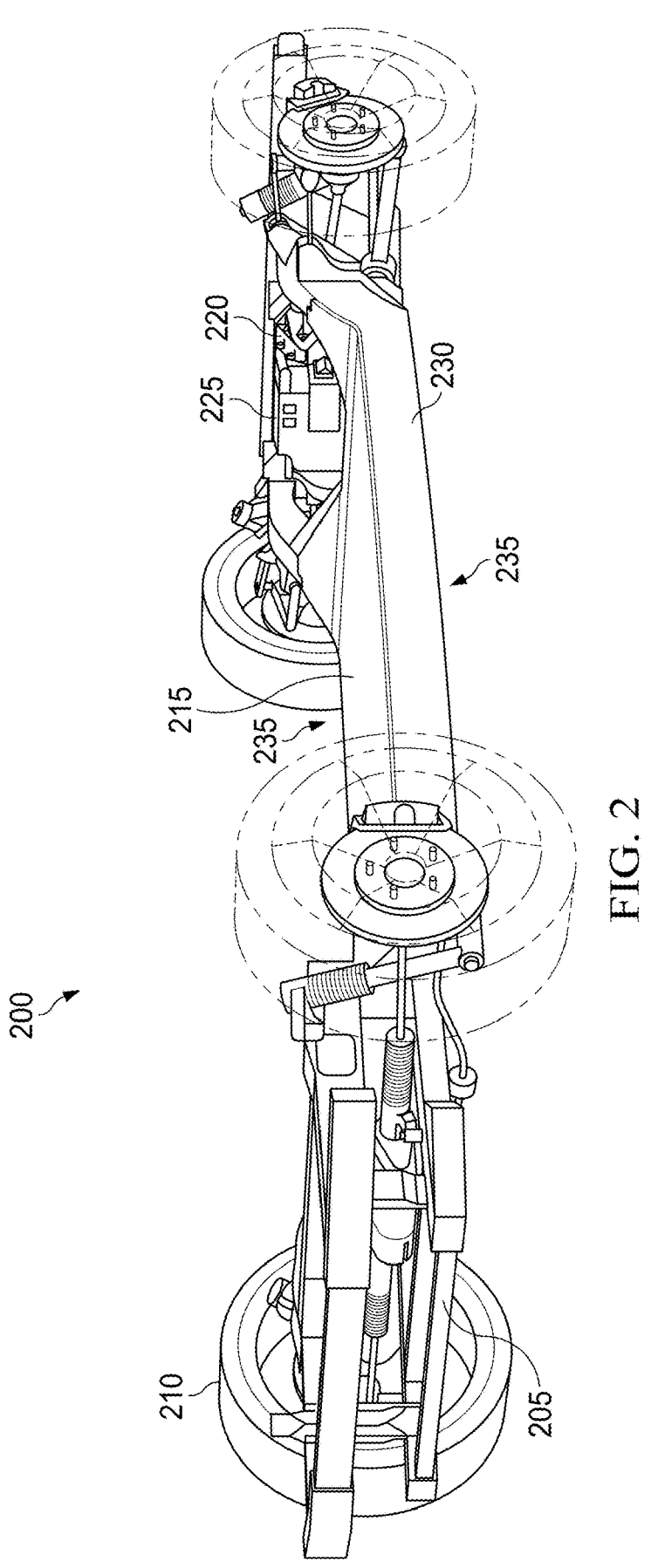
FIG. 2 illustrates an example vehicle platform for a multi-platform, reconfigurable, multifuel adaptable series hybrid electric pick-up truck according to embodiments of the present disclosure.

FIG. 2 illustrates an example vehicle platform for a multi-platform, reconfigurable, multifuel adaptable series hybrid electric pick-up truck according to embodiments of the present disclosure. The embodiment of the vehicle platform 200 illustrated in FIG. 2 is for illustration and explanation only. FIG. 2 does not limit the scope of this disclosure to any particular implementation of a vehicle platform.

According to embodiments of this disclosure, a vehicle platform 200 includes a base frame 205. The base frame 205 can include coupling mounts configured to connect wheels 210 to the base frame 205. In some embodiments, the base frame 205 includes a battery pack 215 integrated therein. The vehicle platform 200 includes one or more electric drivetrain units, such as a rear drivetrain unit (RDU) 220 and a front drivetrain unit (FDU) 225.

The base frame 205 can be made of any suitable material, such as carbon steel, aluminum alloys, and the like. The base frame 205 includes one or more rails 230 that extend laterally along a length of the vehicle platform 200. The rails 230 are configured to form lateral edges of a battery compartment or battery containment unit. The base frame 205 can further include one or more panels 235 configured to extend horizontally on top and bottom portions of the rails 230. In certain embodiments, the rails 230 and panels are configured to form the battery compartment integrated into the base frame 205. The battery compartment is further configured to house the components of the battery pack 215.

In certain embodiments, the base frame 205 includes a charger. The charger is coupled to a charging port, which is configured to be selectively coupled to an external power source, such as a wall socket, or electric power connector. The charger can receive alternating current (AC) electrical energy and convert the AC electrical energy into a direct current (DC) electrical energy to charge the battery pack 115.

Although FIG. 2 illustrates one example of a vehicle platform 200, various changes may be made to FIG. 2. For example, the vehicle platform 200 could include any number of each component in any suitable arrangement. In general, vehicle systems come in a wide variety of configurations, and FIG. 2 does not limit the scope of this disclosure to any particular configuration. Also, while FIG. 2 illustrates one vehicular configuration in which various features disclosed in this patent document can be used, these features could be used in any other suitable system.

Figures 3, 3A:
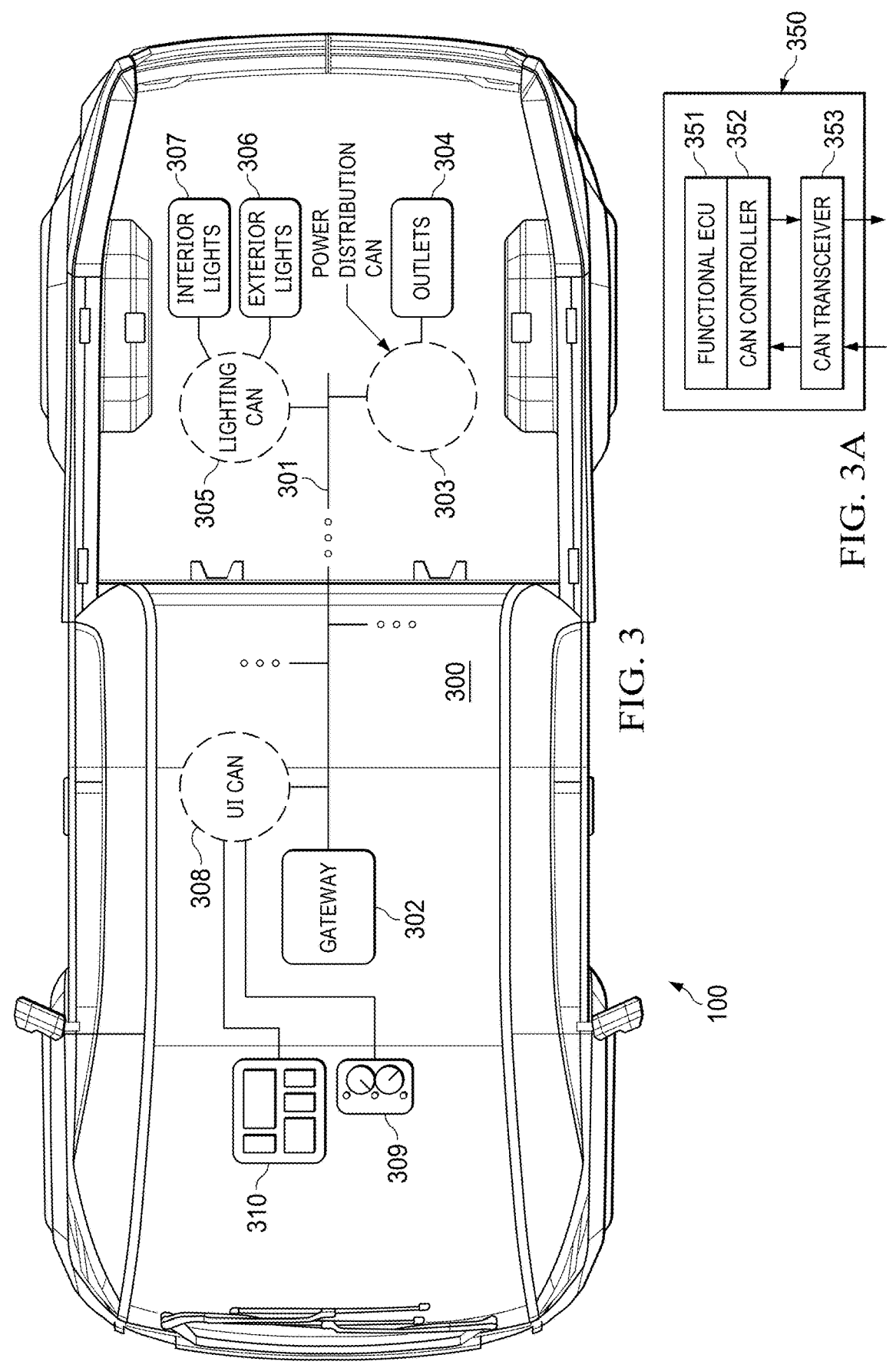
FIGS. 3 and 3A illustrate an example vehicle control system 300 for a multi-platform, reconfigurable, multifuel adaptable series hybrid electric pick-up truck in accordance with embodiments of the present disclosure.

FIGS. 3 and 3A illustrate an example vehicle control system 300 for a multi-platform, reconfigurable, multifuel adaptable series hybrid electric pick-up truck in accordance with embodiments of the present disclosure. The embodiment of the vehicle control system 300 illustrated in FIGS. 3 and 3A is for illustration and explanation only. FIGS. 3 and 3A do not limit the scope of this disclosure to any particular implementation of a vehicle control system.

The vehicle 100 is configured to be operated through the control of a control system 300. The control system 300 is configured to receive inputs from an operator of the vehicle via one or more input interfaces. For example, the operator can interact with a touch screen coupled to the control system 300 and can interact with accelerator and brake pedals and steering wheels.

The vehicle 100 can include "fly-by-wire" connections for the steering wheel, accelerator, and brakes. For example, instead of a steering column linkage between the steering wheels and front wheels, the vehicle 100 includes a wired or wireless connection for controlling the wheel steering direction in response to movement of the steering wheel. The steering wheel can include a processor and one or more position sensors configured to detect a rotational orientation and movement of the steering wheel. Based on a detected rotational position or movement of the steering wheel, the processor transmits control signals to one or more actuators coupled to the front wheels (or rear wheels if so equipped) to turn or adjust a direction of travel of the respective wheels. In certain embodiments, the control signals are sent directly from the processor (or control system 300) in the steering wheel to the actuators. In certain embodiments, the control signals are sent via the control system 300. Similarly, the brake pedal assembly can include a processor and one or more position sensors configured to detect position movement of the respective pedals and transmits control signals, directly or through the control system 300, to actuators coupled to the brake assemblies to engage in, or release, a braking operation. Additionally, the brake pedal assembly can include a processor and one or more position sensors configured to detect position movement of the respective pedals and transmits control signals directly, or through the control system 300, to the drive train units.

In certain embodiments, the control system 300 is configured to drive the vehicle without operator input. For example, after the control system 300 receives a desired destination, the control system 300 is configured to control the functions of the vehicle 100, such as drivetrain, brakes, steering, and lights, to drive the vehicle to the desired destination without further input from the operator or individual that specified the destination. As such, the vehicle can be equipped with one or more external cameras and sensors to detect road and traffic conditions, including traffic control devices, such as traffic lights and street signs, to navigate to the desired destination. Additionally, the control system 300 can be equipped with a global positioning system (GPS) and associated navigation software to enable navigation.

FIG. 3 depicts a modern vehicle control system 300 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 3). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 3, the vehicle control system 300 includes a CAN bus 301 embodied or controlled by a gateway ECU 302, which facilitates messages on and among CANs, transmitted and detected by ECUs. FIG. 3 illustrates a power distribution CAN 303 to which an outlets/connections ECU 304 is connected and a lighting CAN 305 to which an exterior lights ECU 306 and an interior lights ECU 307 are connected. The vehicle control system 300 in FIG. 3 also includes a user interface (UI) CAN 308 to which a "dashboard" ECU 309 and a touchscreen ECU 310 are connected. The ECUs 309 and 310 may be integrated with the respective dashboard controls and touchscreen. The UI CAN 308 and the associated dashboard ECU 309 and touchscreen 310 allow the operator to view indicators such as motor temperature. The dashboard ECU 309 may be connected to one or more sensors and one or more indicators other than those on the dashboard, such as the one or more temperature sensors described above.

FIG. 3A illustrates a high level block diagram for the architecture 350 of each CAN depicted in FIG. 3. Each CAN shown in FIG. 3, including the power distribution CAN 303 and lighting CAN 305, includes a functional ECU 351 for the specific function performed by the respective CAN (such as power routing in the case of power distribution CAN 303). The functional ECU 351 is coupled to a CAN controller 352 that controls the interactions of the respective CAN with the other CANs within the vehicle 100 through the gateway ECU 302. A CAN transceiver 353 receives messages from and transmit messages to other CANs under the control of the CAN controller 352.

Although FIGS. 3 and 3A illustrate one example of a vehicle control system 300 for an EV within which cost-effective drive unit lubrication and cooling can be implemented, those skilled in the art will recognize that the full structure and operation of a suitable vehicle control system is not depicted in the drawings or described here. Instead, for simplicity and clarity, only the structures and operations necessary for an understanding the present disclosure are depicted and described. Various changes may be made to the example of FIGS. 3 and 3A, and the features described in this disclosure may be used with any other suitable vehicle control system.

Figure 4:
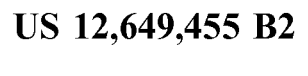
FIG. 4 illustrates a powertrain system in accordance with the present disclosure.

Referring to FIG. 4, a powertrain system in accordance with the present disclosure includes the FDU 225, the RDU 220, an energy storage system (ESS) 401, which preferably but not exclusively includes the battery pack 215, and a multifuel engine motor generator (MG) 402, typically employing an ICE. Placement of these components can vary without departing from the scope of the present disclosure. The ESS 401 can be selectively plugged in to an external power grid and charged up, or charged while the vehicle is in motion with the multifuel engine MG 402. When the ESS 401 drops below certain state of charge, the MG 402 will (preferably automatically) kick in and continuously charge the ESS 401.

Figure 4A:
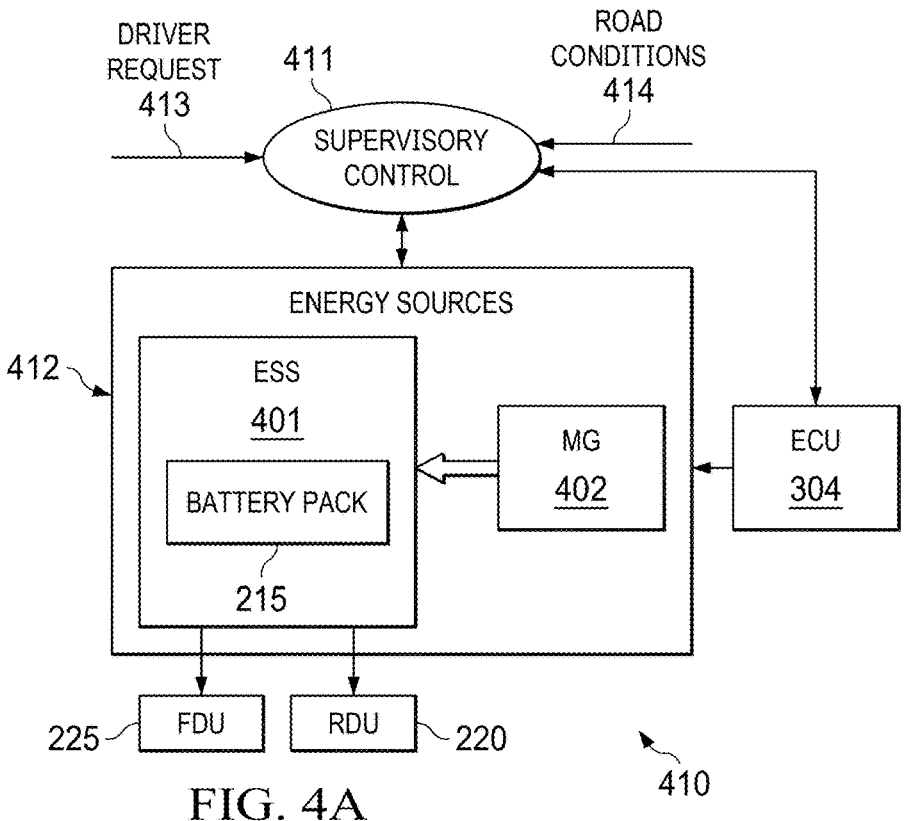
FIG. 4A is a diagram of the power distribution control architecture in accordance with the present disclosure.

Referring to FIG. 4A, a diagram of the power distribution control architecture 410 in accordance with the present disclosure is depicted. Power distribution control architecture 410 includes a vehicle supervisor controller 411 and energy sources 412. As shown, the energy sources 412 preferably include the ESS 401 and the MG 402. The outlets/connections ECU 304 communicates with the energy source 412 and with the vehicle supervisor controller 411. The vehicle supervisor controller 411 also receives driver request signal(s) 413, for example from an accelerator control, a brake control, or other user interface control. The vehicle supervisor controller 411 further receives road conditions signal(s) 414 from, for example, road load sensors, payload sensors or input, weather conditions sensors or input, and terrain information for where the vehicle has or will be driven (e.g., from a navigation application).

Figure 5:
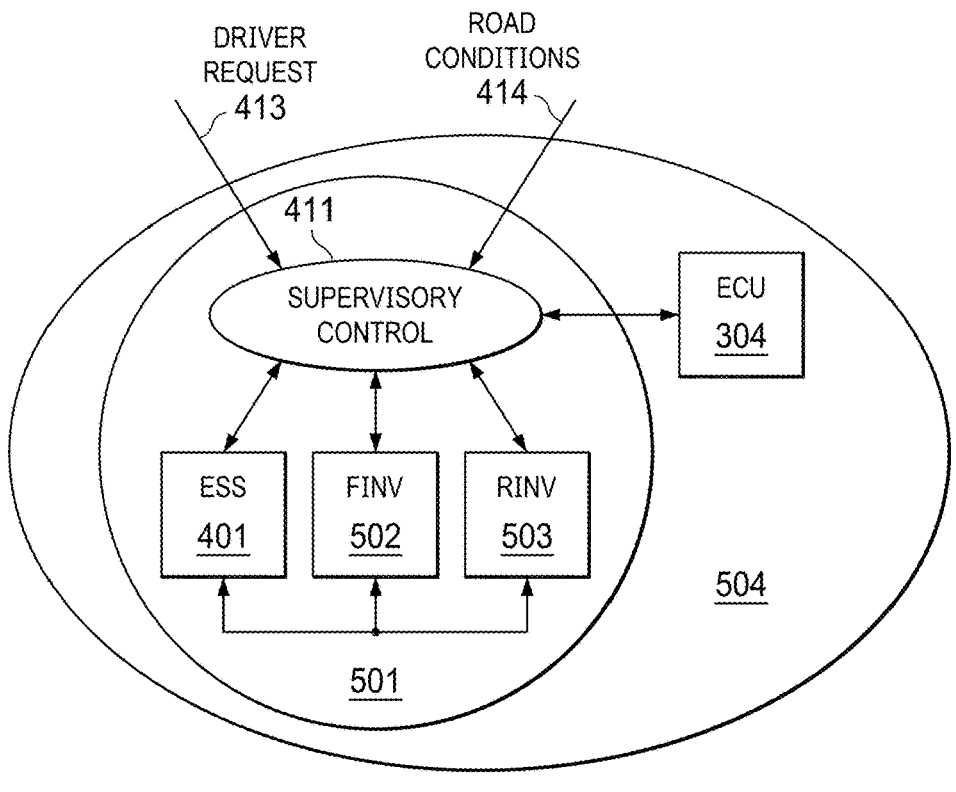
FIG. 5 is a diagram of various domains for signaling and control within a power distribution system in accordance with the present disclosure.

Referring to FIG. 5, a diagram of various domains for signaling and control within a power distribution system in accordance with the present disclosure is depicted. A first domain 501 includes the vehicle supervisor controller 411, the ESS 401, a front inverter (FINV) 502, and a rear inverter (RINV) 503. A second domain 504 includes the first domain 501 and the ECU 304. The driver request signal(s) 413 and the road conditions signal(s) 414 originate from outside the second domain 504. The domain 501 is the basic operating system of the vehicle 100. The operating strategy is represented by the domain 501 when the vehicle is in electric-only power mode (e.g., silent operation), and represents what the vehicle 100 will do. When the vehicle 100 is series hybrid mode (i.e., hybrid power mode), the vehicle operates in the domain 504 and will bring the ICE in MG 402 into operation. A switch in the system, through the application program interfaces (APIs) on the human user interface for the vehicle allows the user to select or sometimes override the vehicle supervisory controller 411, or vice versa (i.e., the vehicle supervisory controller 411 overrides the user selection), if the charge state of ESS 401 drops below certain level.

Referring to FIGS. 3, 4, 4A, and 5, the vehicle supervisor controller 411 executes on the gateway ECU 302, sometimes also referred to as the vehicle interface control module (VICM). The vehicle supervisor controller 411 calculates, for a given speed, how much torque is required from one or more inputs received from (among other things) the driver request signal(s) 413, a charge state of the ESS 401, and the road conditions signal(s) 414. The vehicle supervisor controller 411 determines whether the vehicle 100 will need to operate in the hybrid mode, and will command the MG 402 to turn on and charge the ESS 401 if the ESS 401 has insufficient charge, if the vehicle 100 is operating in a normal mode. If the vehicle 100 is operating in a "silent" mode, the vehicle supervisor controller 411 will command that the MG 402 never come on while ensuring that the ESS 401 has sufficient charge to power the FINV 502 and/or the RINV 503.

The vehicle supervisory controller 411 can, at any given point, decide based on the selected mode (e.g., "normal" or "silent") of the vehicle 100, whether the vehicle 100 will operate either an electric-only power mode or a hybrid power mode (in which the MG 402 may be activated). The vehicle supervisory controller 411 will turn the ICE within the MG 402 on or off, so ICE activation/deactivation may be a function of two factors. Selection of a dominant or controlling one of those two factors may vary depending on whether the user has specified operation in the hybrid power mode, in which case the ICE within MG 402 may come on as necessary to maintain charge state in the ESS 401. The ICE in MG 402 engine will also come on when user has selected hybrid power mode or electric-only power mode in anything other than a silent operation scenario (absent manual override). Artificial intelligence (e.g., an AI engine bot) in the gateway ECU 302 may be used to predict electric-only or hybrid power modes, based on learning data. In order to make the power mode decision, the AI may utilize an extremely large and complicated matrix of information from outside world, such as payload information, available road information, energy information, how the vehicle is being driven, where the vehicle is going, the degree of knowledge about terrain along the projected travel path, and the like.

In general, the vehicle supervisory controller 411 will make the decision of when the ICE in the MG 402 turns on or off based on the other selected mode(s) and/or the charge state of the ESS 401, and will propel the vehicle 100 based on the driver request 413.

In a military operations environment, it may be preferable not to activate the ICE within the MG 402 unless necessary (e.g., to preserve ability of the vehicle 100 to take evasive action), because operation of the ICE produces both noise and a detectable thermal image. When in silent mode operation, the ICE within MG 402 should never come on unless (for instance) the battery pack 215 within the ESS 401 needs to be protected from damage. When the vehicle 100 is in silent mode or electric-only power mode, then if the state of charge (SoC) of the battery pack 215 within ESS 401 is (for example) at 90%, the ICE in the MG 402 may not come on; if the battery SoC is at 85%, the ICE within the MG 402 still may not come on. However, if the battery SoC drops to or below 50%, then the ICE within the MG 402 may come on.

Figure 6:
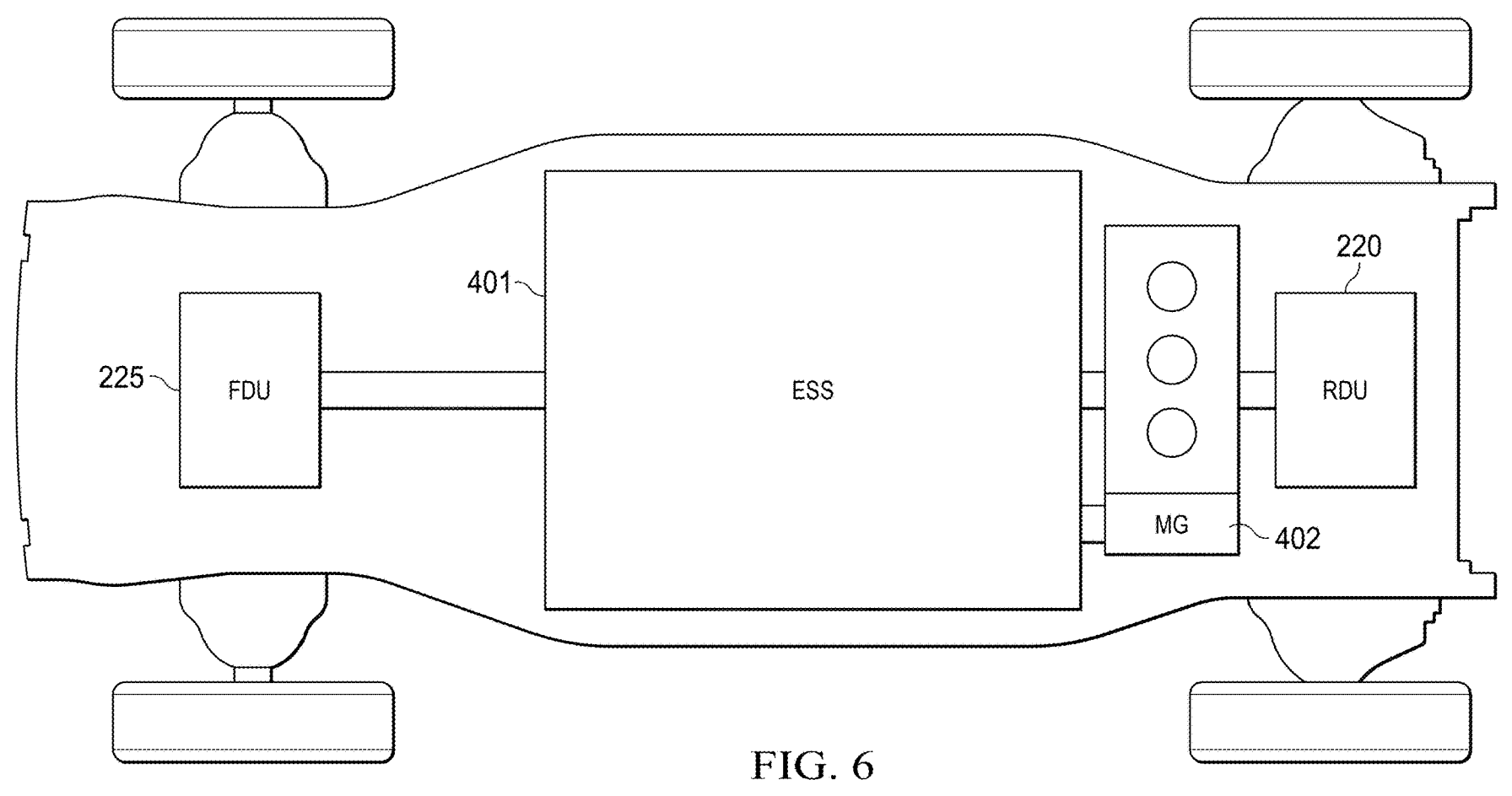

FIG. 6 illustrates an alternative design for a powertrain system in accordance with the present disclosure, in which the ICE (adjacent MG 402) is also shown and the approximate layout of the components on a plan view of the vehicle platform is depicted.

Figure 7:
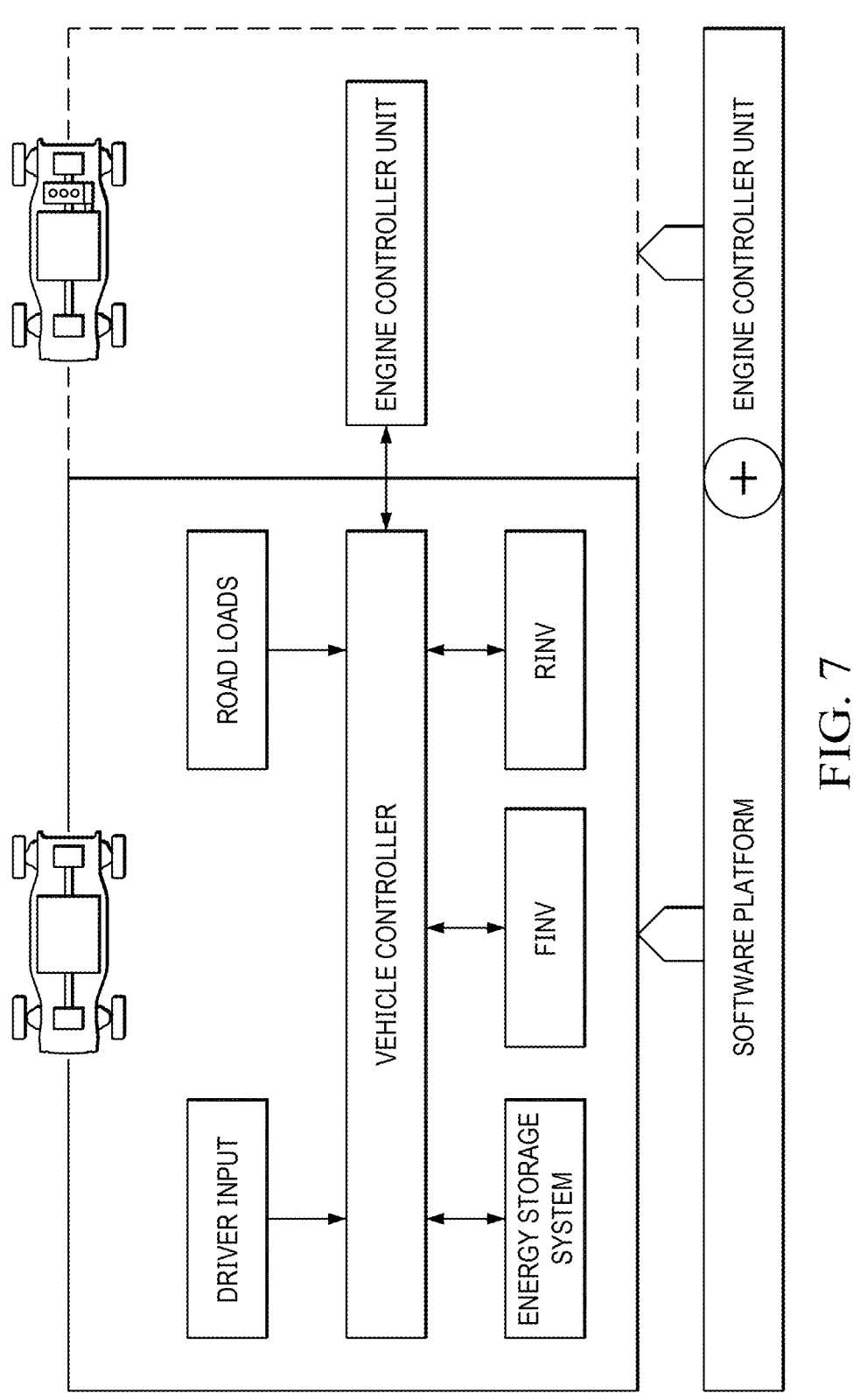
FIG. 7 diagrammatically illustrates the control architecture for a vehicle capable of operating in electric-only power mode and hybrid power mode according to embodiments of the present disclosure.

FIG. 7 diagrammatically illustrates the control architecture for a vehicle capable of operating in electric-only power mode and hybrid power mode according to embodiments of the present disclosure. The software platform for control of electric-only power operation maybe readily extended by adding engine controller hardware and software for the ICE of the MG, which is optionally segregated.

Figure 8:
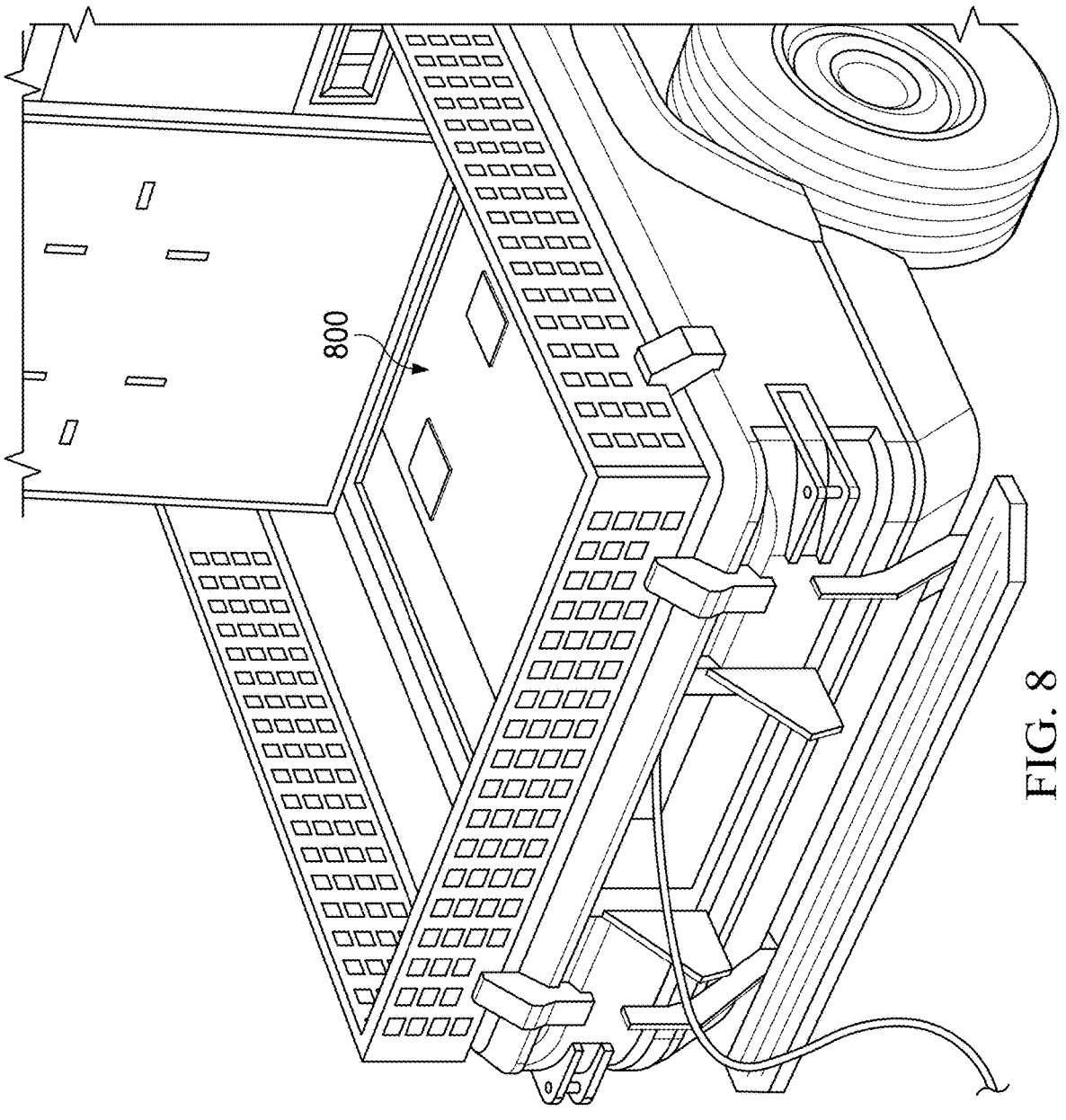
FIG. 8 illustrates generally the location of a motor generator, an electric auxiliary power unit (APU), or both in accordance with embodiments of the present disclosure.
Figure 9A:
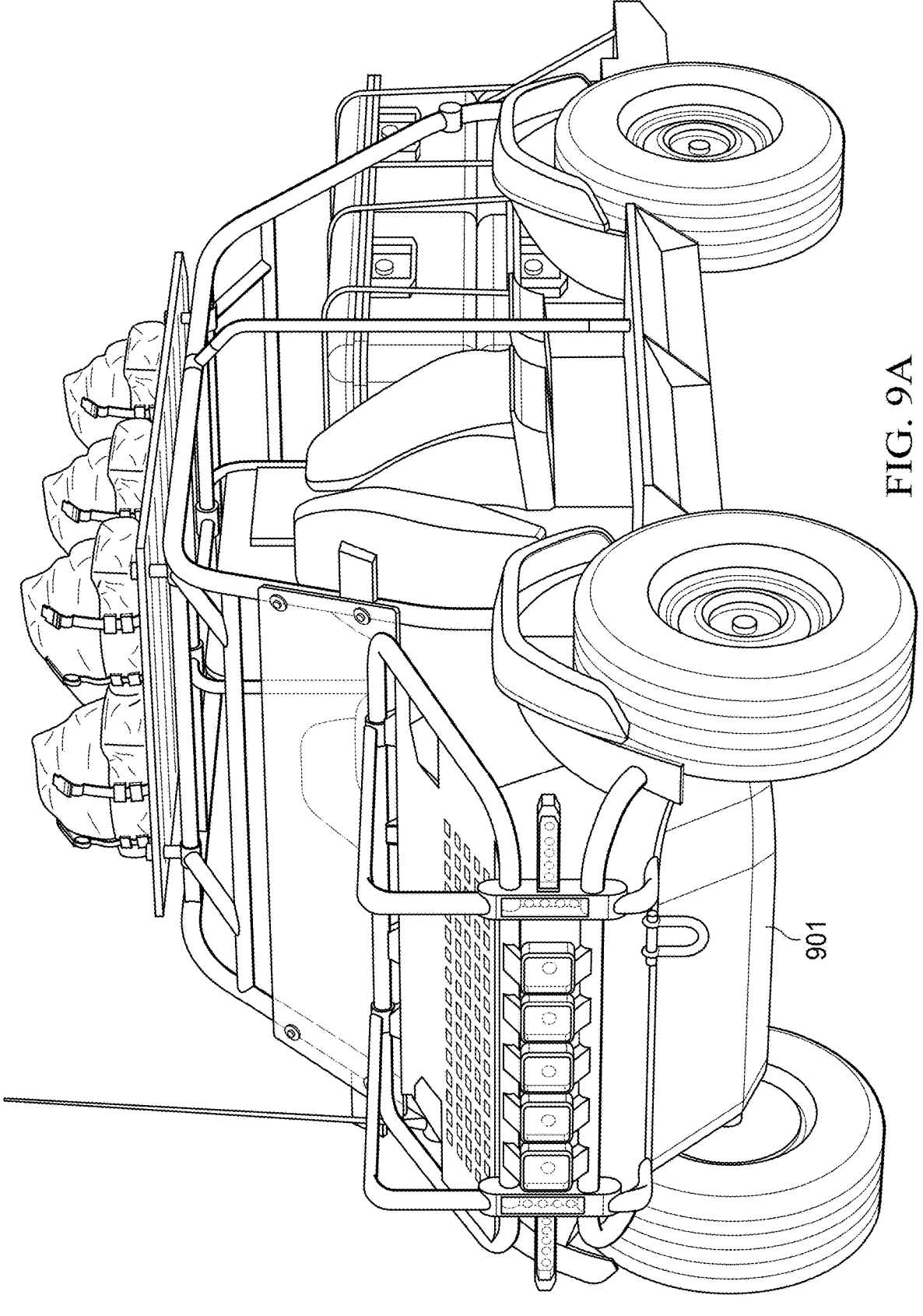
FIGS. 9A through 9F are various views of an alternative top-hat design for the vehicle according to embodiments of the present disclosure, for military applications.
Figure 9B:
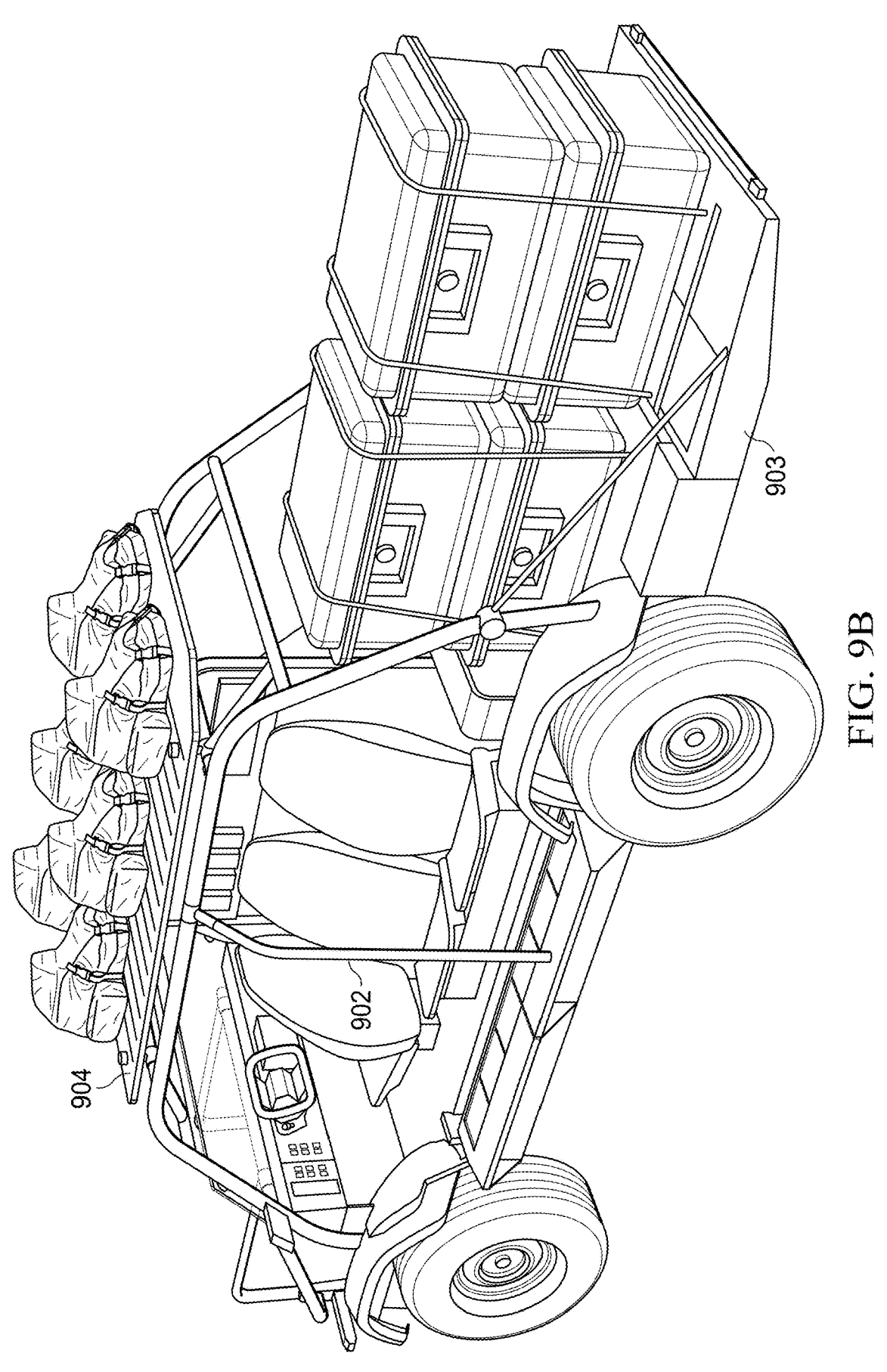
Figure 9C:
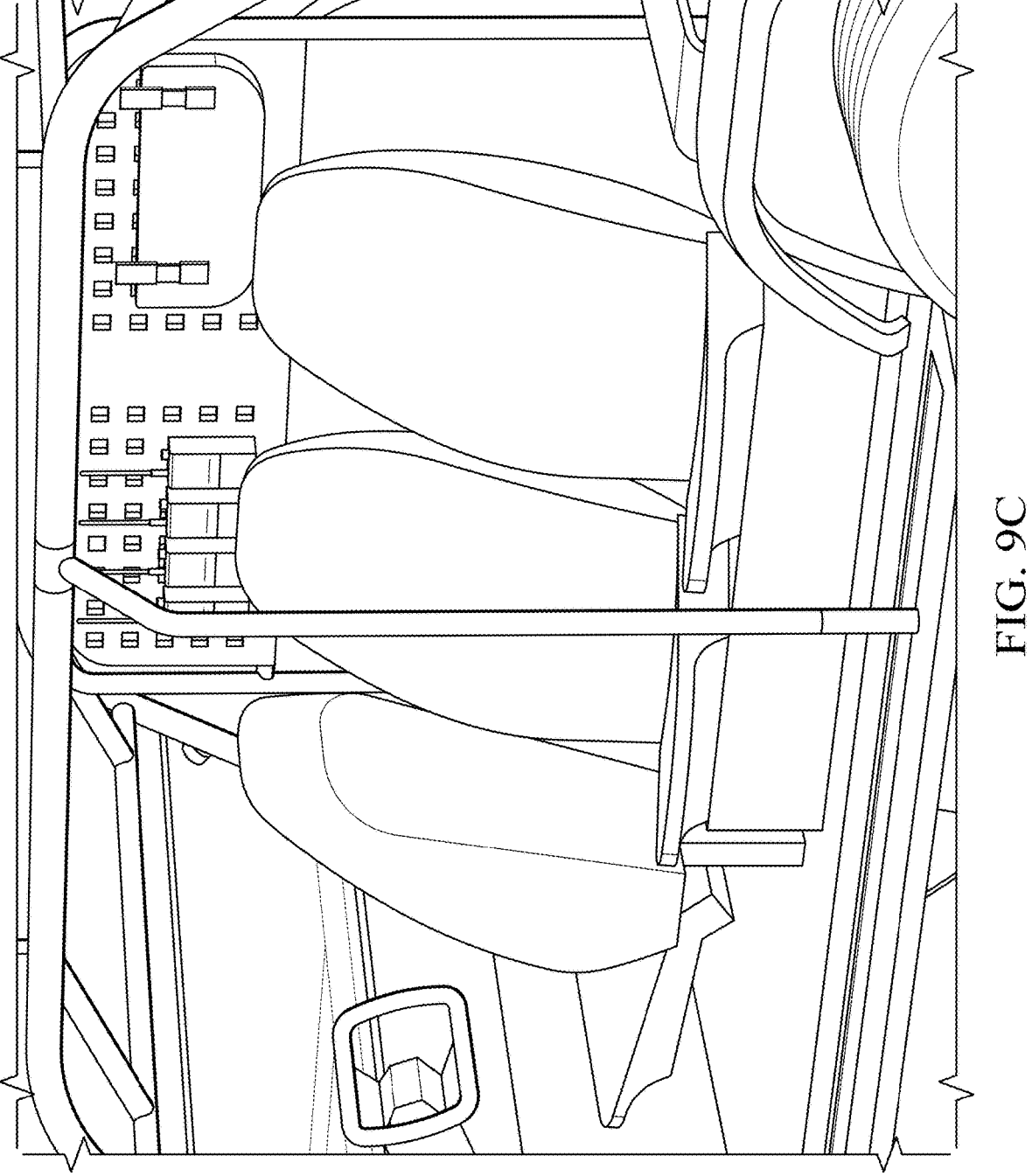
Figure 9D:
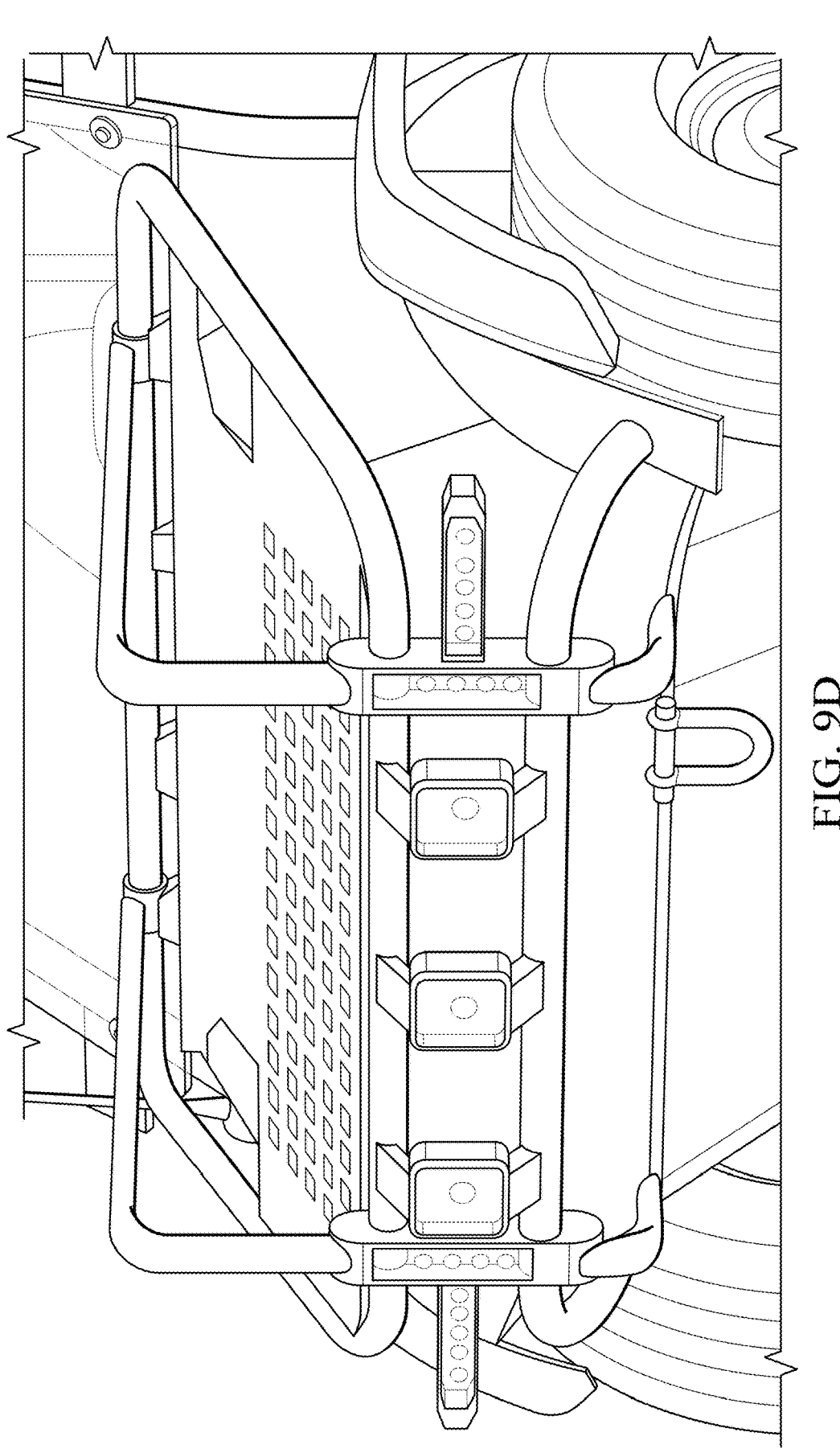
Figure 9E:
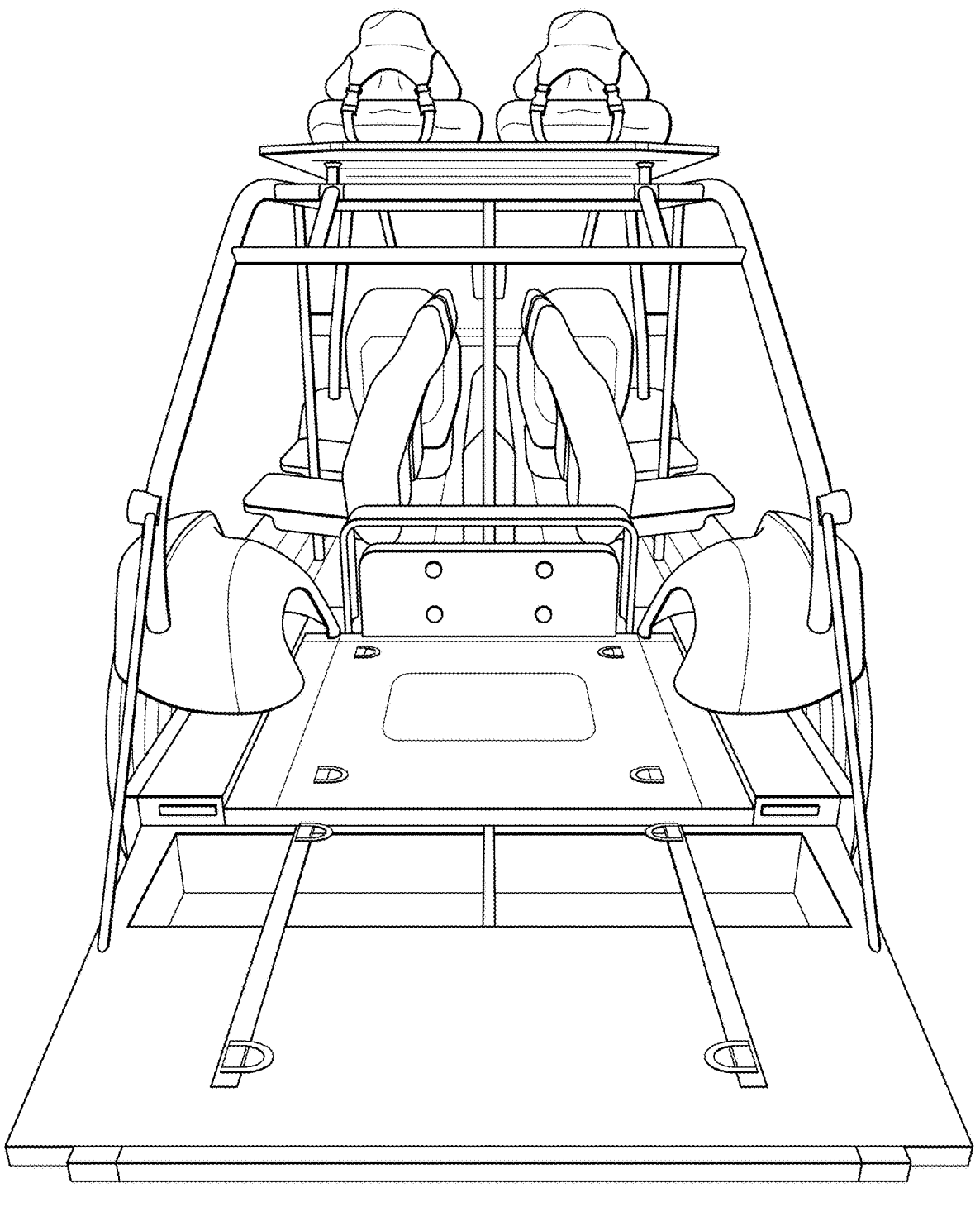
Figure 9F:
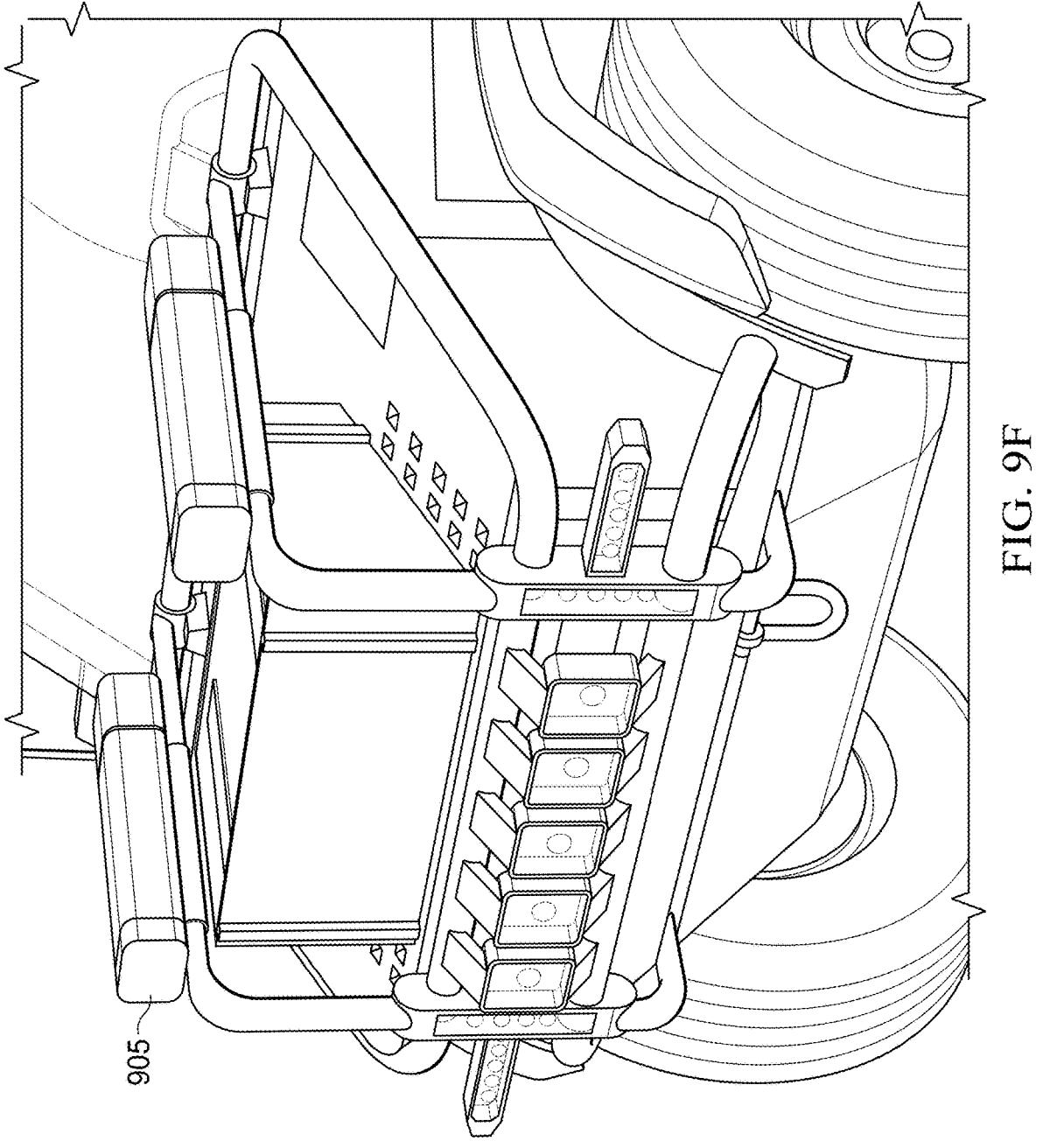
Figure 10A:
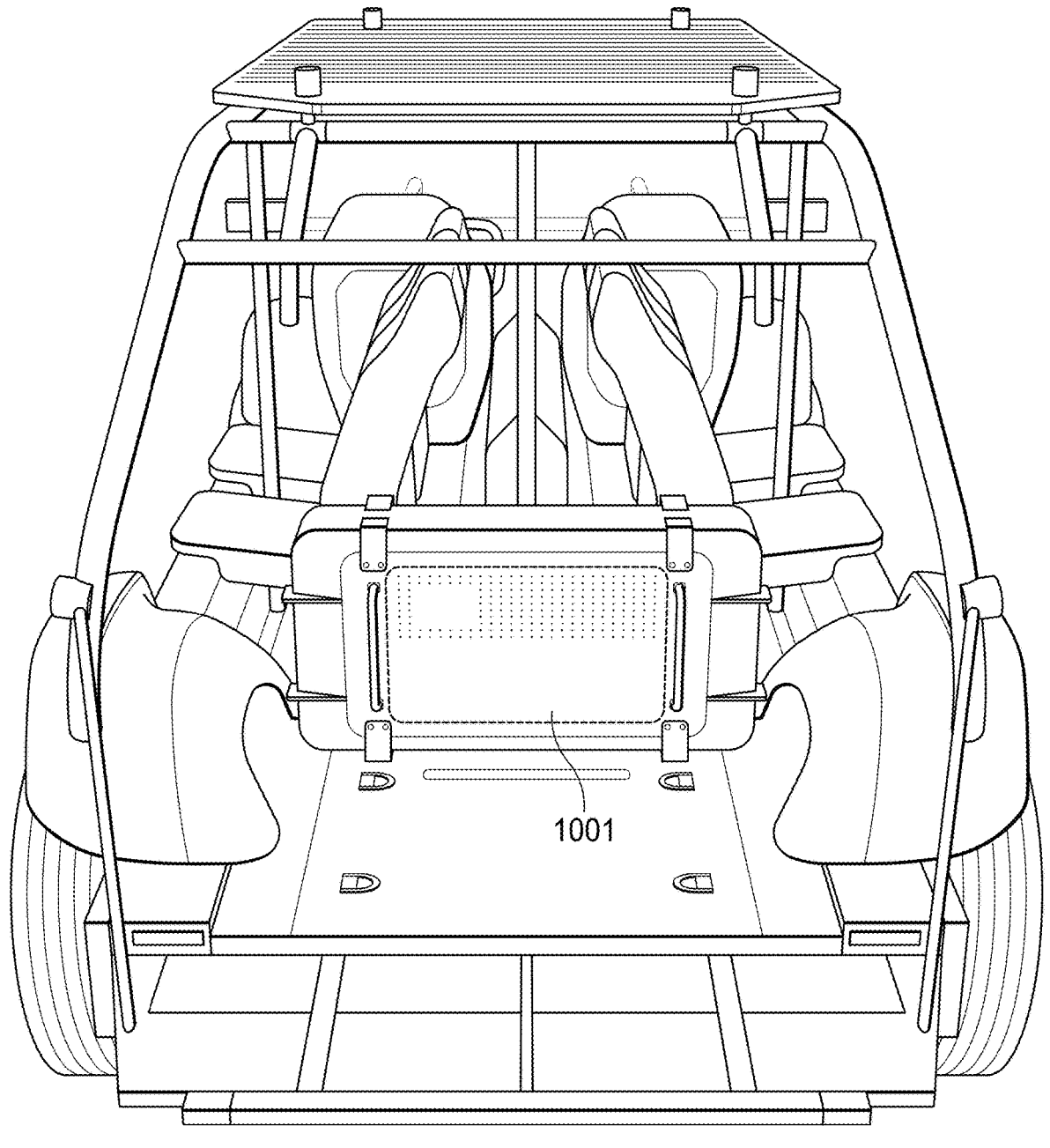
FIGS. 10A through 10E illustrate one example of placement and construction of the motor generator in the vehicle design of FIGS. 9A through 9F.
Figure 10B:
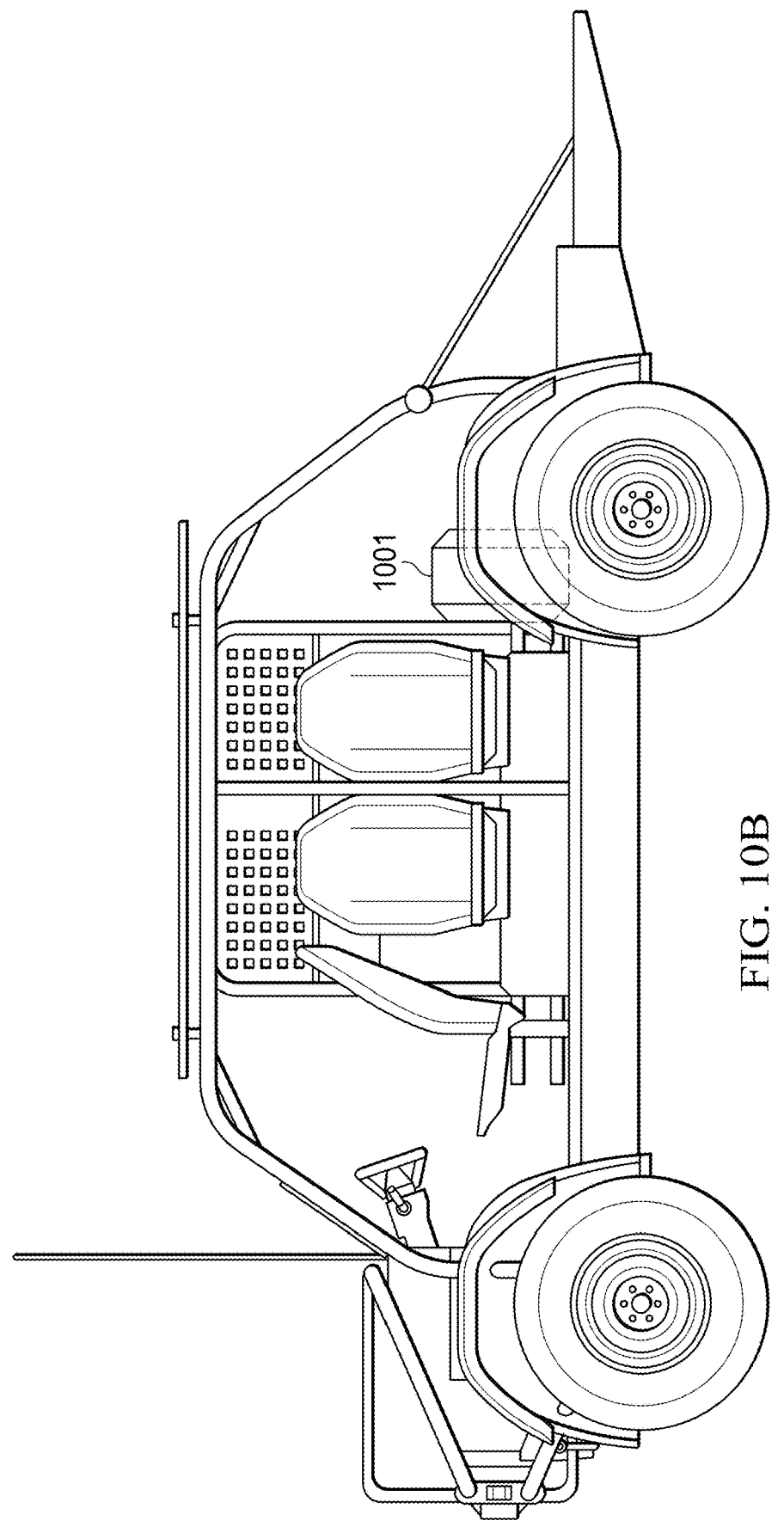
Figure 10C:
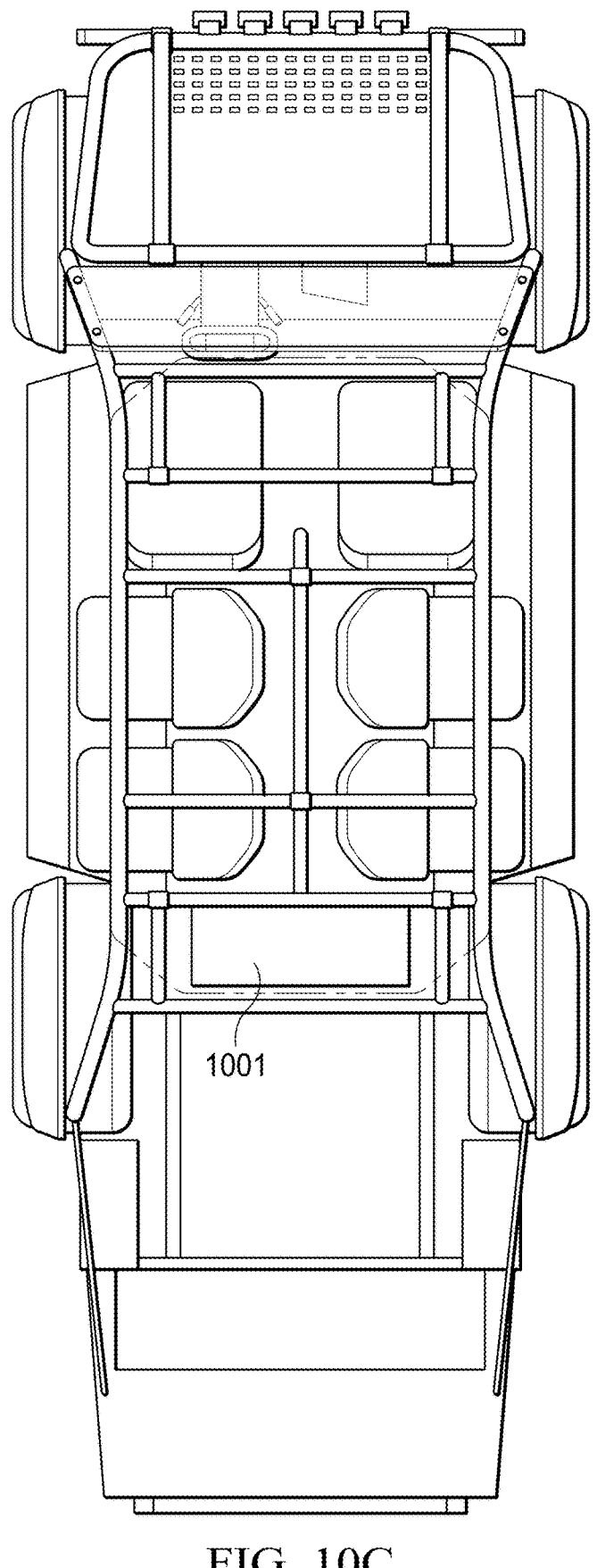
Figure 10D:
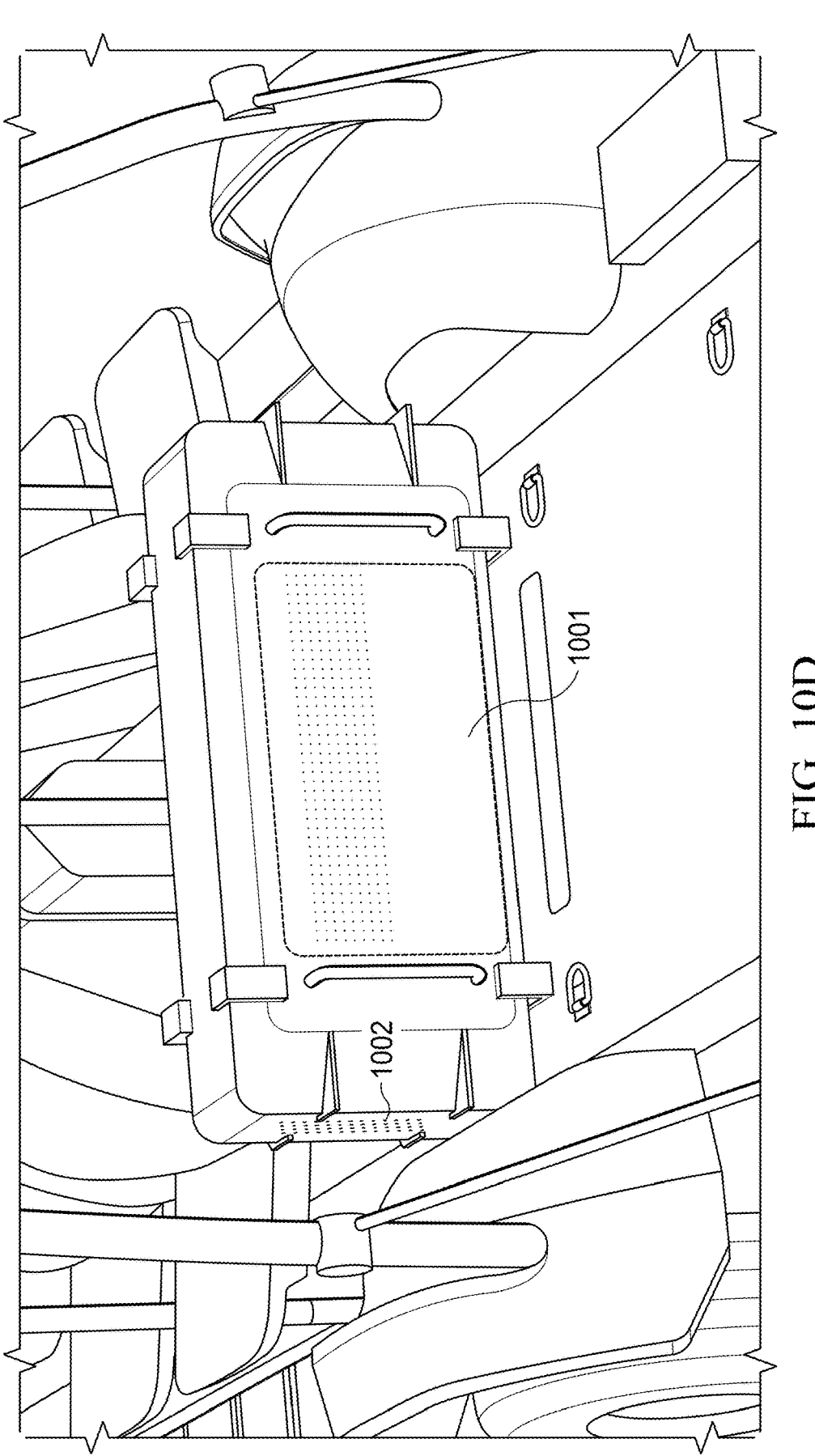
Figure 10E:
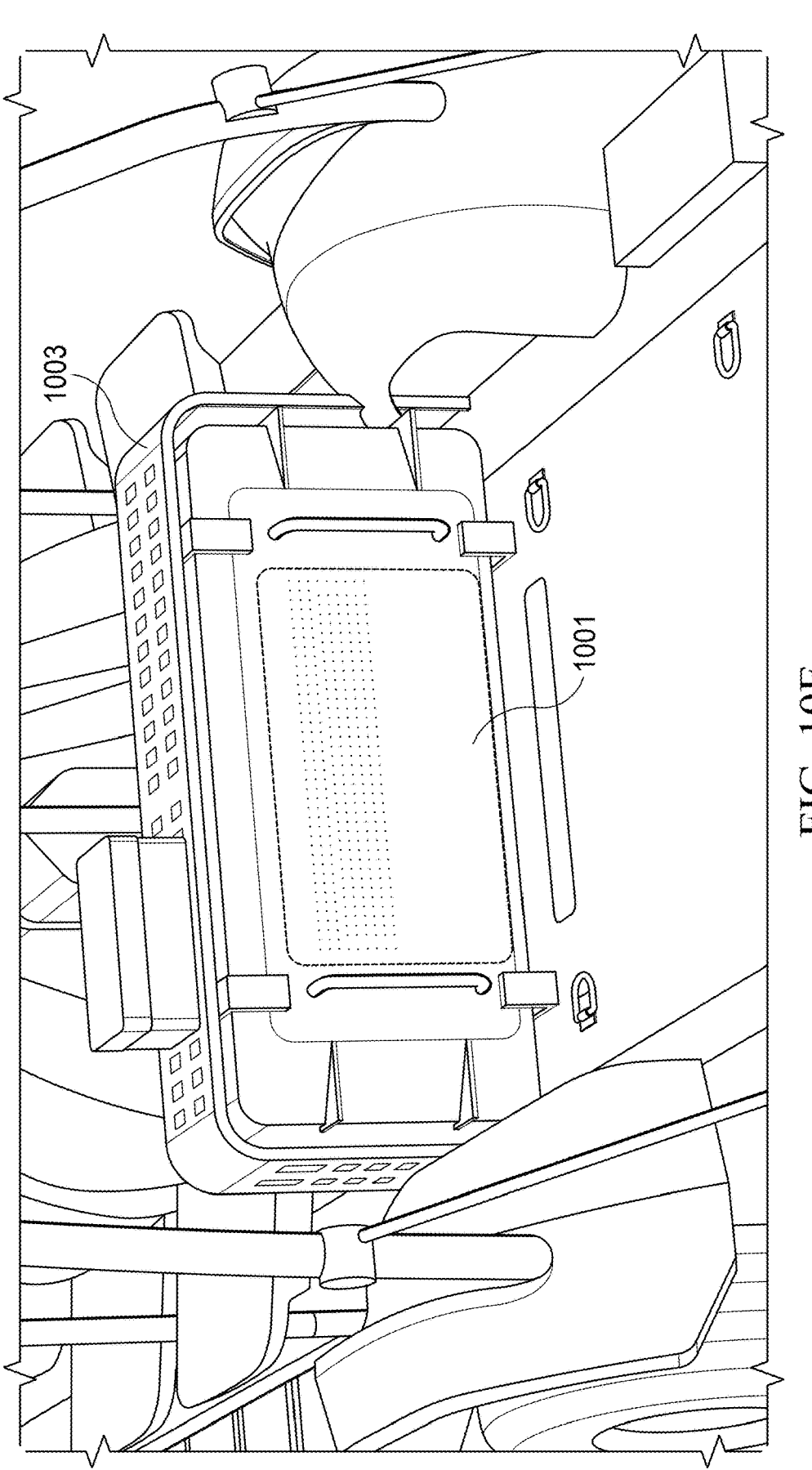

Referring to FIG. 8, the MG 402 or an electric auxiliary power unit (APU) (or both) may reside at a location 800 in the bed of the truck. Alternatively, either the MG 402 or the APU, or both, may reside at another location, such as a space that might otherwise be utilized for a front trunk.

With its features, utilitarian design, and compact maneuverability, the vehicle 100 is suitable for use by everyone on the road, on a dirt road, or off-road. The vehicle 100 is purposefully designed to help everyday people be more productive and enjoy a return on capital from the vehicle 100, putting money back into the pockets of the consumers.

FIGS. 9A through 9F are various views of an alternative top-hat design for the vehicle 100, for military applications. In the example show, the cabin includes two forward-facing seats for the operator and one passenger, behind which are located four outward-facing seats for easy in and out by additional personnel. A blast shield 901 is provided on the undercarriage at the front, on an angled front surface and extending rearward over at least the front axle, and optionally over the entire undercarriage. Grab handles 902 are provided on the sides, and a foldable flatbed 903 with rails and D-rings is provided at the rear. In addition to storage inside the cabin, roof rack 904 for cargo is provided. The front of the vehicle may be fitted with a Molle panel for storage (compare FIGS. 9D and 9F) and rails 905 as weapons mounts.

FIGS. 10A through 10E illustrate one example of placement and construction of the ICE for the MG 402 in the vehicle design of FIGS. 9A through 9F. In the example shown, a housing 1001 for the MG 402 is disposed on the forward part of the flatbed 903, immediately behind the passenger seating. The housing 1001 includes ventilation holes on the major surface(s), and optionally also ventilation holes 1002 on the side(s). The housing 1001 may be provided without or with a Molle panel frame 1003.

Figure 11A:
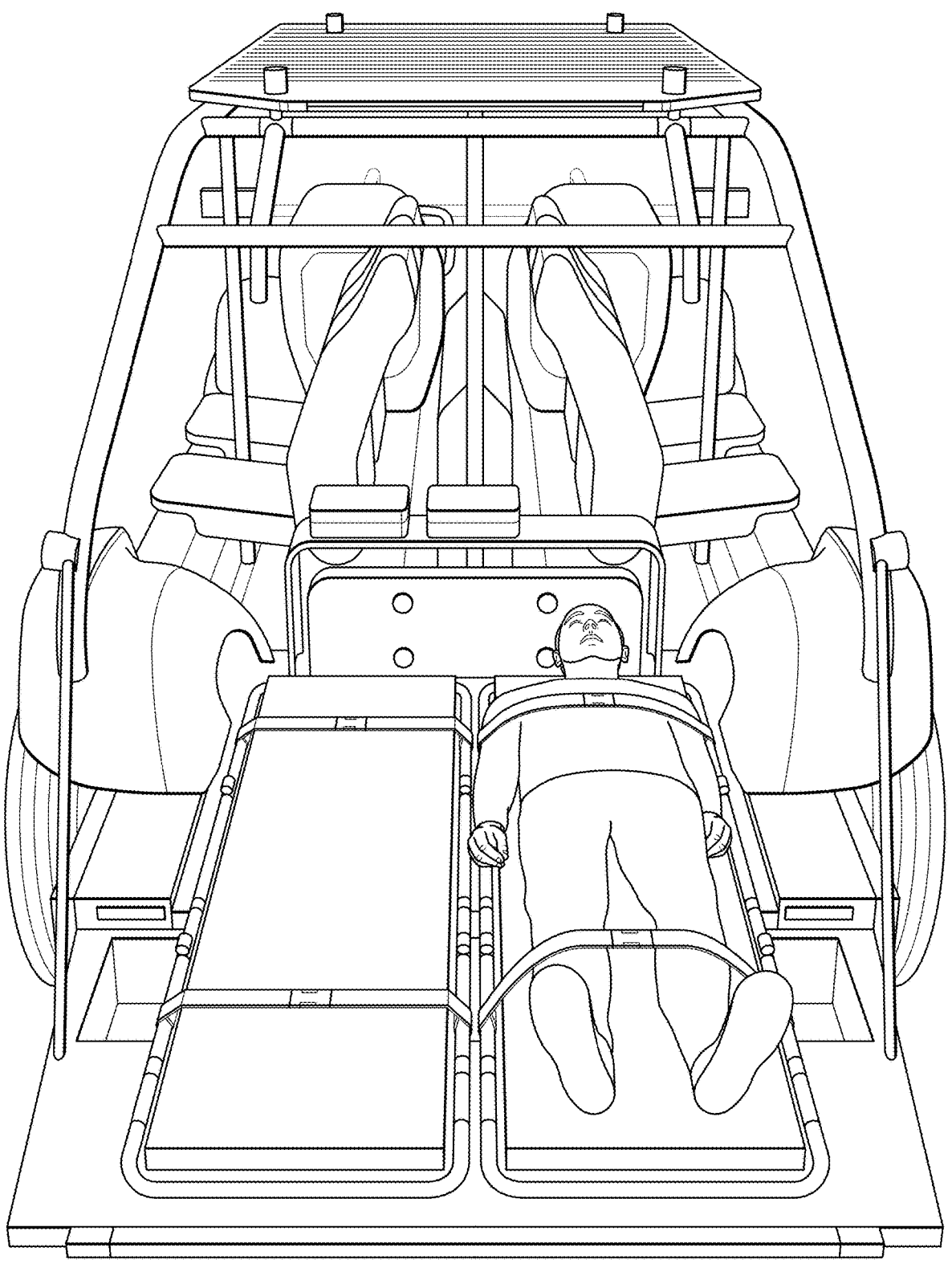
FIGS. 11A through 11C are various views of an alternative design for the flatbed in the vehicle design of FIGS. 9A through 9F.
Figure 11B:
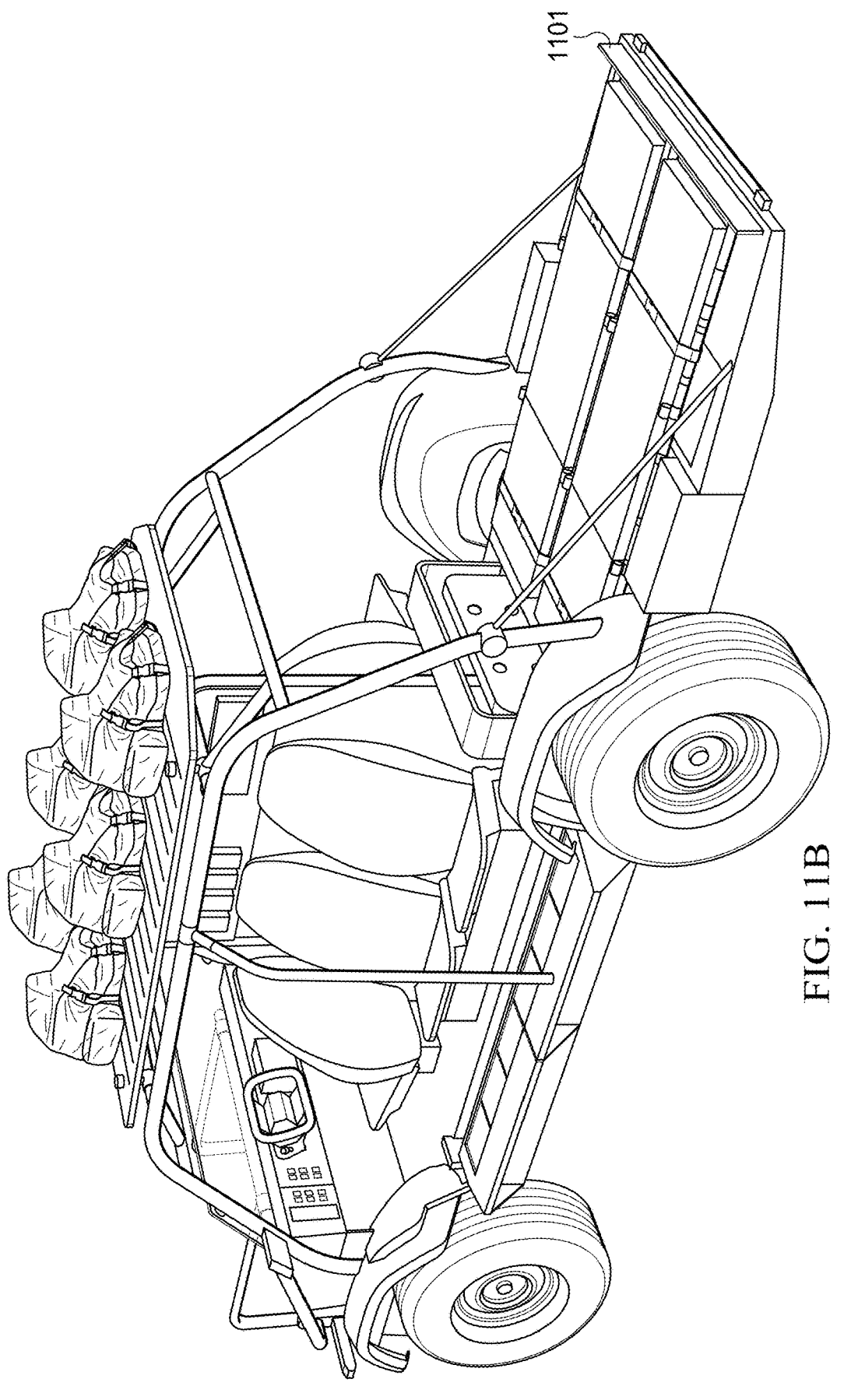
Figure 11C:
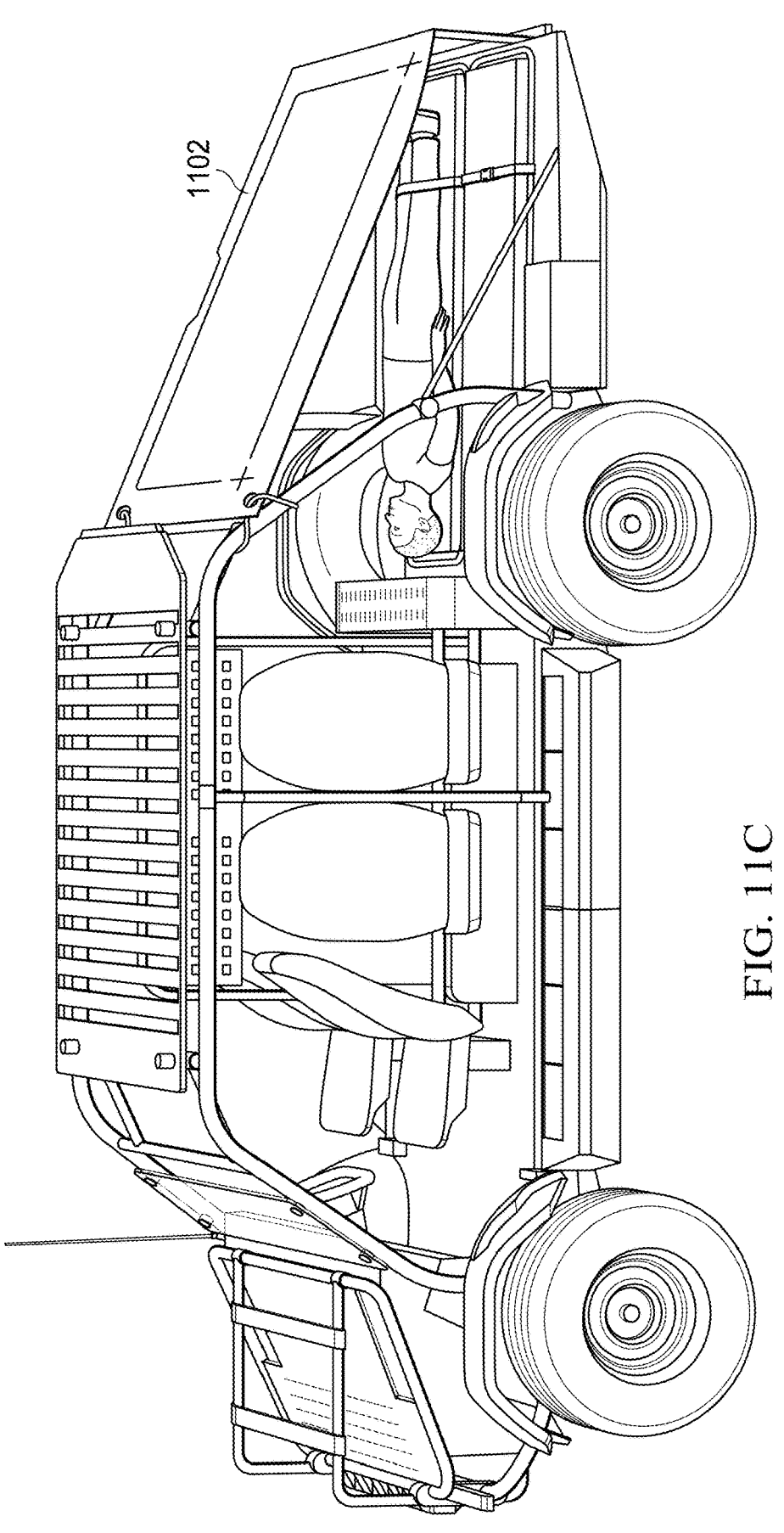

FIGS. 11A through 11C are various views of an alternative design for the flatbed in the vehicle design of FIGS. 9A through 9F. The flatbed in the alternative of FIGS. 11A through 11C is designed to hold stretchers, secured in place by the rails and D-rings and with a barrier 1101 to prevent or inhibit the stretchers and/or occupants from sliding off the end of the flatbed, as well as features allowing quick mounting of a tarp 1102 to provide shade for occupants of the stretchers. First aid boxes may be mounted on the Molle panel frame, as shown.

Figure 12A:
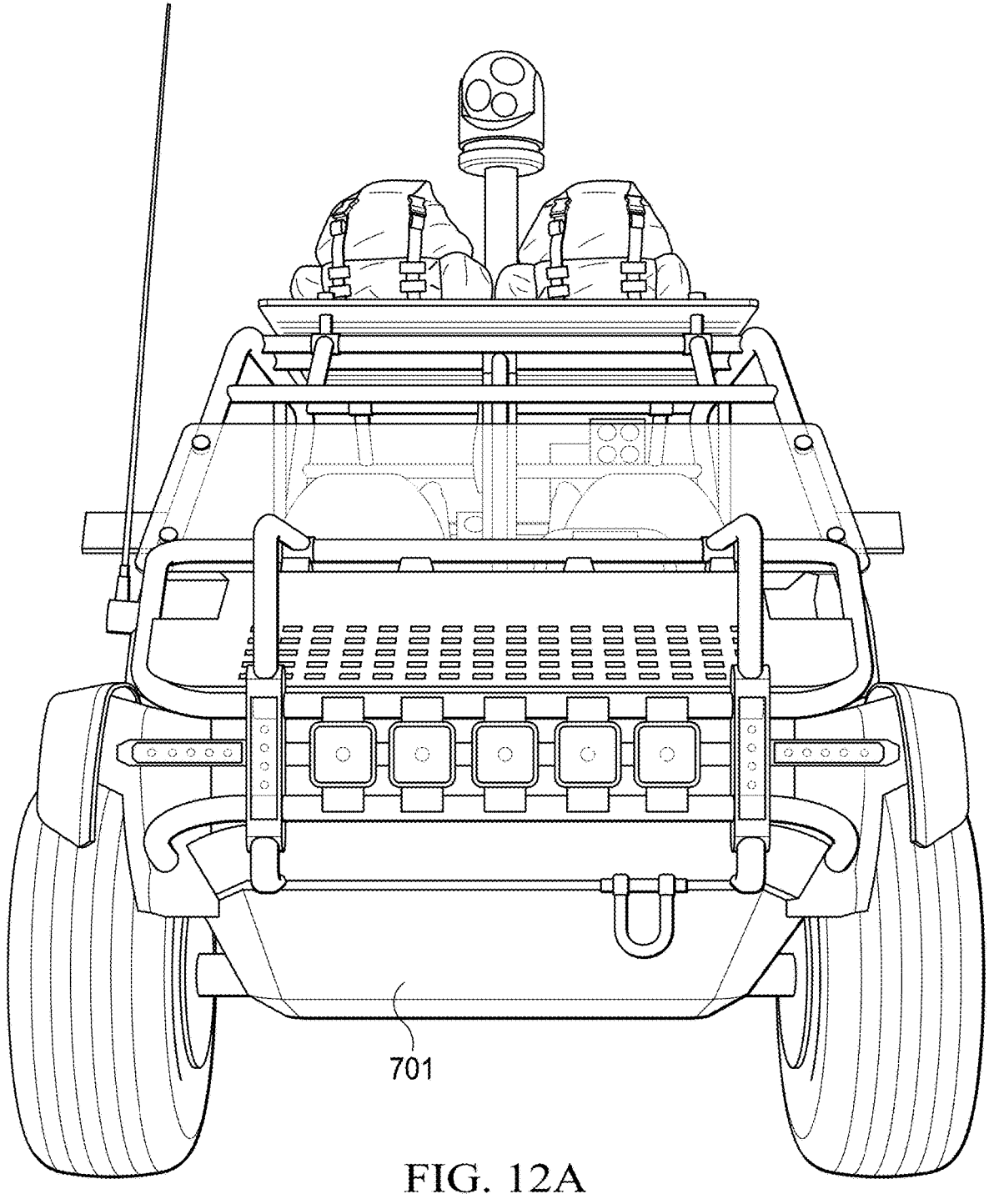
FIGS. 12A through 12C are various views of VAMPIRE system mounting on the vehicle design of FIGS. 9A through 9F.
Figure 12B:
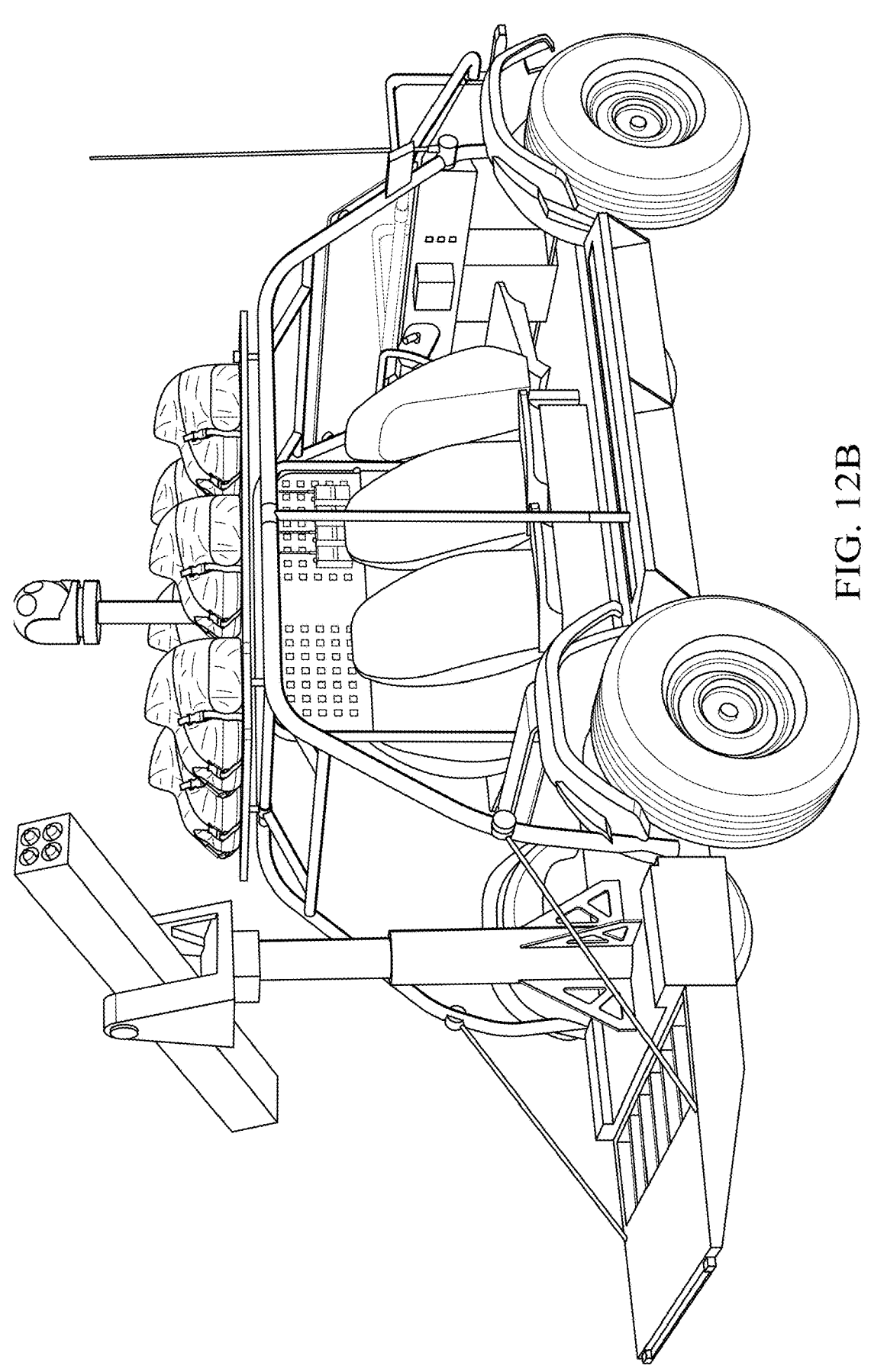
Figure 12C:
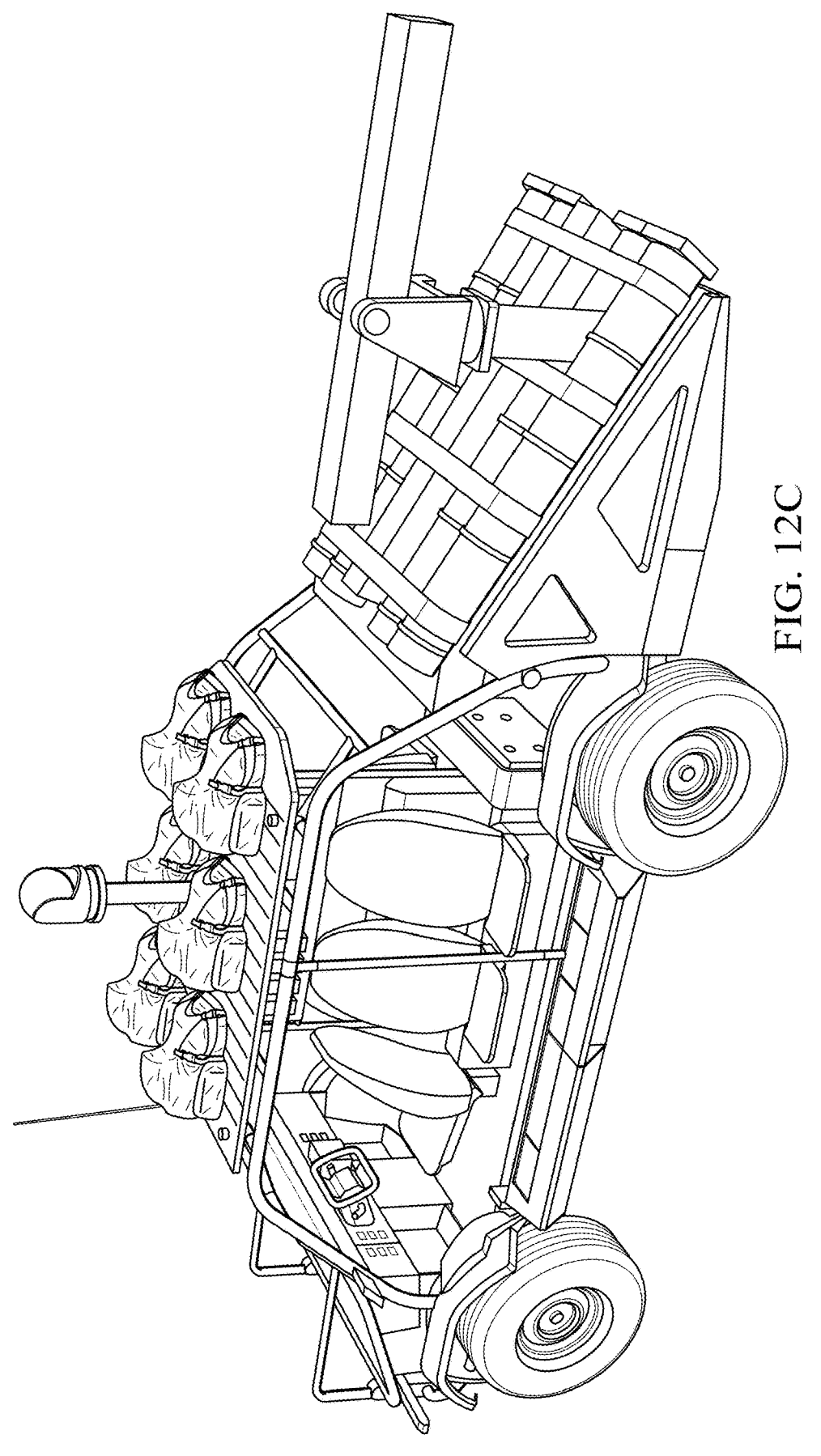

FIGS. 12A through 12C are various views of VAMPIRE system mounting on the vehicle design of FIGS. 9A through 9F, showing the VAMPIRE system in both operational and stowed states.

Figure 13:
FIG. 13 illustrates an alternative example of placement of the motor generator in the vehicle design of FIGS. 9A through 9F.

FIG. 13 illustrates an alternative example of placement of the ICE for the MG 402 in the vehicle design of FIGS. 9A through 9F, showing the battery pack 215 and electric motor and drivetrain components 1301.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A series hybrid electric vehicle, comprising:
an energy storage system;
a motor generator comprising an internal combustion engine (ICE); and
a vehicle supervisor controller configured to control activation of the ICE to recharge the energy storage system based on whether a silent mode of operation is set, the vehicle supervisor controller, when in the silent mode of operation, permitting the motor generator to propel the series hybrid electric vehicle without activation of the ICE unless necessary to propel the series hybrid electric vehicle to take evasive action.

2. The series hybrid electric vehicle according to claim 1, wherein, in multiple modes of operation, the vehicle supervisor controller is configured to control activation of the ICE to recharge the energy storage system based on a charge state of the energy storage system reaching a predetermined level.

3. The series hybrid electric vehicle according to claim 2, wherein, in the silent mode of operation, the predetermined level is a state of charge inhibiting evasive action by the series hybrid electric vehicle.

4. The series hybrid electric vehicle according to claim 2, wherein, in at least one mode of operation other than the silent mode of operation, the predetermined level is based on at least a speed of the series hybrid electric vehicle.

5. The series hybrid electric vehicle according to claim 4, wherein, in the at least one mode of operation other than the silent mode of operation, the predetermined level is based on a driver request signal.

6. The series hybrid electric vehicle according to claim 4, wherein, in the at least one mode of operation other than the silent mode of operation, the predetermined level is based on weather conditions.

7. The series hybrid electric vehicle according to claim 4, wherein the at least one mode of operation other than the silent mode of operation includes a normal mode of operation.

8. The series hybrid electric vehicle according to claim 1, wherein the energy storage system includes a battery pack.

9. The series hybrid electric vehicle according to claim 1, further comprising a user interface configured to adjust settings of the vehicle supervisor controller.

10. The series hybrid electric vehicle according to claim 9, wherein the user interface is configured to override the vehicle supervisor controller.

11. A method of operating a series hybrid electric vehicle including an energy storage system and a motor generator comprising an internal combustion engine (ICE), the method comprising:

operating a vehicle supervisor controller to control activation of the ICE to recharge the energy storage system based on whether a silent mode of operation is set, the vehicle supervisor controller, when in the silent mode of operation, permitting the motor generator to propel the series hybrid electric vehicle without activation of the ICE unless necessary to propel the series hybrid electric vehicle to take evasive action.

12. The method according to claim 11, further comprising:

operating the vehicle supervisory controller in multiple modes of operation to control activation of the motor generator to recharge the energy storage system based on a charge state of the energy storage system reaching a predetermined level.

13. The method according to claim 12, wherein, in the silent mode of operation, the predetermined level is a state of charge inhibiting evasive action by the series hybrid electric vehicle.

14. The method according to claim 12, wherein, in at least one mode of operation other than the silent mode of operation, the predetermined level is based on at least a speed of the series hybrid electric vehicle.

15. The method according to claim 14, wherein, in the at least one mode of operation other than the silent mode of operation, the predetermined level is based on a driver request signal.

16. The method according to claim 14, wherein, in the at least one mode of operation other than the silent mode of operation, the predetermined level is based on weather conditions.

17. The method according to claim 14, wherein the at least one mode of operation other than the silent mode of operation includes a normal mode of operation.

18. The method according to claim 11, wherein the energy storage system includes a battery pack.

19. The method according to claim 11, further comprising:

using a user interface to adjust settings of the vehicle supervisor controller to control activation of the motor generator to recharge the energy storage system.

20. The method according to claim 19, further comprising using the user interface to override the vehicle supervisor controller.

* * * * *